United States Patent [19]
Hashemi et al.

[11] Patent Number: 5,671,349
[45] Date of Patent: Sep. 23, 1997

[54] APPARATUS AND METHOD FOR PROVIDING DATA REDUNDANCY AND RECONSTRUCTION FOR REDUNDANT ARRAYS OF DISK DRIVES

[75] Inventors: Ebrahim Hashemi, Los Gatos, Calif.; Martin E. Schulze, Longmont, Colo.

[73] Assignee: Hitachi Computer Products America, Inc., Santa Clara, Calif.

[21] Appl. No.: 350,743

[22] Filed: Dec. 6, 1994

[51] Int. Cl.$^6$ ................................................. G06F 11/00
[52] U.S. Cl. ........................................................ 395/182.04
[58] Field of Search ........................ 395/183.04, 182.04; 360/48; 364/737, 245.3, 243, 268.9, 281.9, 285.3, 944.61

[56] References Cited

U.S. PATENT DOCUMENTS

| | | | |
|---|---|---|---|
| 4,494,234 | 1/1985 | Patel | 371/38 |
| 4,504,948 | 3/1985 | Patel | 371/38 |
| 4,525,838 | 7/1985 | Patel | 371/37 |
| 4,706,250 | 11/1987 | Patel | 371/39 |
| 4,775,978 | 10/1988 | Hartness | 371/38 |
| 4,870,643 | 9/1989 | Bultman et al. | 371/11.1 |
| 4,914,656 | 4/1990 | Dunphy, Jr. et al. | 371/10.2 |
| 4,942,579 | 7/1990 | Goodlander et al. | 371/51 |

FOREIGN PATENT DOCUMENTS 0369707  11/1989  European Pat. Off. .......... G06F 3/06

OTHER PUBLICATIONS

Patel, "Two-level coding for error control in magnetic disk storage products", IBM J. Res. Dev., vol. 33, No. 4, pp. 470–484 Jul. 1989.

Chen, "Symbol Error-Correcting Codes for Computer Memory Systems", IEEE Trans. on Computers, vol. 41, No. 2, pp. 252–256 Feb. 1992.

Kaneda et al., "Single Byte Error Correcting—Double Byte Error Detecting Codes for Memory Systems", IEEE, 41–46 Oct. 1980.

Bossen, "b–Adjacent Erro Correction", IBM J. Res. Dev., pp. 402–408 Jul. 1970.

"Two–Level Coding for Error Control in Magnetic Disk Storage Products," by Patel, published by IBM, San Jose. Date unknown.

"Failure Correction Techniques for Large Disk Arrays," by Gibson, et al. University of California at Berkeley, 1989, ACM.

*Primary Examiner*—Robert W. Beausoliel, Jr.
*Assistant Examiner*—Stephen C. Elmore
*Attorney, Agent, or Firm*—Flehr Hohbach Test Albritton & Herbert LLP

[57] ABSTRACT

The present invention provides a system of hardware and software that combine to form a redundant array of disk drives. This array provides a double means of redundancy that can reconstruct data from two simultaneously failed disks. The double redundancy means is implemented by two separate algorithms, DRR1 and DRR2. DRR1 takes the exclusive-or of all the commercial data and stores the result as redundancy data. DRR2 is similar to the algorithm described in Patel's article. As an additional feature, the implementation of DRR1 and DRR2 in the present invention is flexible enough to support either on-the-fly or read-modify-write level operation. Although both algorithms are in the prior art, the present invention improves on the run-time and space requirements of the algorithm. This improvement arises because of a novel relationship, discussed below, that exist between the individual $T^1$ matrices and their column vectors that allows for a savings in computing the mapping of the commercial data to the redundancy data. This unique relationship is incorporated into the present systems hardware and software.

20 Claims, 18 Drawing Sheets

ANTILOG TABLE to get 1st column of T-matrix from power of T-matrix

Address is power of T-matrix
Data is 1st column of T-matrix

| HEX ADDRESS | HEX DATA | | |
|---|---|---|---|
| 0 | 1 | 19 | D6 |
| 1 | 2 | 1A | 5 |
| 2 | 4 | 1B | A |
| 3 | 8 | 1C | 14 |
| 4 | 10 | 1D | 28 |
| 5 | 20 | 1E | 50 |
| 6 | 40 | 1F | A0 |
| 7 | 80 | 20 | E9 |
| 8 | A9 | 21 | 7B |
| 9 | FB | 22 | F6 |
| A | 5F | 23 | 45 |
| B | BE | 24 | 8A |
| C | D5 | 25 | BD |
| D | 3 | 26 | D3 |
| E | 6 | 27 | F |
| F | C | 28 | 1E |
| 10 | 18 | 29 | 3C |
| 11 | 30 | 2A | 78 |
| 12 | 60 | 2B | F0 |
| 13 | C0 | 2C | 49 |
| 14 | 29 | 2D | 92 |
| 15 | 52 | | |
| 16 | A4 | | |
| 17 | E1 | | |
| 18 | 6B | | |

FIG. 7A

| | | | |
|---|---|---|---|
| 2E | 8D | 50 | FD |
| 2F | B3 | 51 | 53 |
| 30 | CF | 52 | A6 |
| 31 | 37 | 53 | E5 |
| 32 | 6E | 54 | 63 |
| 33 | DC | 55 | C6 |
| 34 | 11 | 56 | 25 |
| 35 | 22 | 57 | 4A |
| 36 | 44 | 58 | 94 |
| 37 | 88 | 59 | 81 |
| 38 | B9 | 5A | AB |
| 39 | DB | 5B | FF |
| 3A | 1F | 5C | 57 |
| 3B | 3E | 5D | AE |
| 3C | 7C | 5E | F5 |
| 3D | F8 | 5F | 43 |
| 3E | 59 | 60 | 86 |
| 3F | B2 | 61 | A5 |
| 40 | CD | 62 | E3 |
| 41 | 33 | 63 | 6F |
| 42 | 66 | 64 | DE |
| 43 | CC | 65 | 15 |
| 44 | 31 | | |
| 45 | 62 | | |
| 46 | C4 | | |
| 47 | 21 | | |
| 48 | 42 | | |
| 49 | 84 | | |
| 4A | A1 | | |
| 4B | EB | | |
| 4C | 7F | | |
| 4D | FE | | |
| 4E | 55 | | |
| 4F | AA | | |

FIG. 7B

| | | | |
|---|---|---|---|
| 66 | 2A | 8A | 8E |
| 67 | 54 | 8B | B5 |
| 68 | A8 | 8C | C3 |
| 69 | F9 | 8D | 2F |
| 6A | 5B | 8E | 5E |
| 6B | B6 | 8F | BC |
| 6C | C5 | 90 | D1 |
| 6D | 23 | 91 | B |
| 6E | 46 | 92 | 16 |
| 6F | 8C | 93 | 2C |
| 70 | B1 | 94 | 58 |
| 71 | CB | 95 | B0 |
| 72 | 3F | 96 | C9 |
| 73 | 7E | 97 | 3B |
| 74 | FC | 98 | 76 |
| 75 | 51 | 99 | EC |
| 76 | A2 | 9A | 71 |
| 77 | ED | 9B | E2 |
| 78 | 73 | 9C | 6D |
| 79 | E6 | 9D | DA |
| 7A | 65 | | |
| 7B | CA | | |
| 7C | 3D | | |
| 7D | 7A | | |
| 7E | F4 | | |
| 7F | 41 | | |
| 80 | 82 | | |
| 81 | AD | | |
| 82 | F3 | | |
| 83 | 4F | | |
| 84 | 9E | | |
| 85 | 95 | | |
| 86 | 83 | | |
| 87 | AF | | |
| 88 | F7 | | |
| 89 | 47 | | |

FIG. 7C

| | | | |
|---|---|---|---|
| 9E | 1D | C0 | 12 |
| 9F | 3A | C1 | 24 |
| A0 | 74 | C2 | 48 |
| A1 | E8 | C3 | 90 |
| A2 | 79 | C4 | 89 |
| A3 | F2 | C5 | BB |
| A4 | 4D | C6 | DF |
| A5 | 9A | C7 | 17 |
| A6 | 9D | C8 | 2E |
| A7 | 93 | C9 | 5C |
| A8 | 8F | CA | B8 |
| A9 | B7 | CB | D9 |
| AA | C7 | CC | 1B |
| AB | 27 | CD | 36 |
| AC | 4E | CE | 6C |
| AD | 9C | CF | D8 |
| AE | 91 | D0 | 19 |
| AF | 8B | D1 | 32 |
| B0 | BF | D2 | 64 |
| B1 | D7 | D3 | C8 |
| B2 | 7 | D4 | 39 |
| B3 | E | D5 | 72 |
| B4 | 1C | | |
| B5 | 38 | | |
| B6 | 70 | | |
| B7 | E0 | | |
| B8 | 69 | | |
| B9 | D2 | | |
| BA | D | | |
| BB | 1A | | |
| BC | 34 | | |
| BD | 68 | | |
| BE | D0 | | |
| BF | 9 | | |

*FIG. 7D*

| | | | |
|---|---|---|---|
| D6 | E4 | ED | BA |
| D7 | 61 | EE | DD |
| D8 | C2 | EF | 13 |
| D9 | 2D | F0 | 26 |
| DA | 5A | F1 | 4C |
| DB | B4 | F2 | 98 |
| DC | C1 | F3 | 99 |
| DD | 2B | F4 | 9B |
| DE | 56 | F5 | 9F |
| DF | AC | F6 | 97 |
| E0 | F1 | F7 | 87 |
| E1 | 4B | F8 | A7 |
| E2 | 96 | F9 | E7 |
| E3 | 85 | FA | 67 |
| E4 | A3 | FB | CE |
| E5 | EF | FC | 35 |
| E6 | 77 | FD | 6A |
| E7 | EE | FE | D4 |
| E8 | 75 | FF | XX |
| E9 | EA | | |
| EA | 7D | | |
| EB | FA | | |
| EC | 5D | | |

*FIG. 7E*

LOG TABLE to get power of T-matrix from 1st column of T-matrix

Address is 1st column of T-matrix
Data is power of T-matrix

| HEX ADDRESS | HEX DATA | | HEX ADDRESS | HEX DATA |
|---|---|---|---|---|
| 0 | XX | | 1A | BB |
| 1 | 0 | | 1B | CC |
| 2 | 1 | | 1C | B4 |
| 3 | D | | 1D | 9E |
| 4 | 2 | | 1E | 28 |
| 5 | 1A | | 1F | 3A |
| 6 | E | | 20 | 5 |
| 7 | B2 | | 21 | 47 |
| 8 | 3 | | 22 | 35 |
| 9 | BF | | 23 | 6D |
| A | 1B | | 24 | C1 |
| B | 91 | | 25 | 56 |
| C | F | | 26 | F0 |
| D | BA | | 27 | AB |
| E | B3 | | 28 | 1D |
| F | 27 | | 29 | 14 |
| 10 | 4 | | 2A | 66 |
| 11 | 34 | | 2B | DD |
| 12 | C0 | | 2C | 93 |
| 13 | EF | | 2D | D9 |
| 14 | 1C | | | |
| 15 | 65 | | | |
| 16 | 92 | | | |
| 17 | C7 | | | |
| 18 | 10 | | | |
| 19 | D0 | | | |

FIG. 8A

| | | | |
|---|---|---|---|
| 2E | C8 | 50 | 1E |
| 2F | 8D | 51 | 75 |
| 30 | 11 | 52 | 15 |
| 31 | 44 | 53 | 51 |
| 32 | D1 | 54 | 67 |
| 33 | 41 | 55 | 4E |
| 34 | BC | 56 | DE |
| 35 | FC | 57 | 5C |
| 36 | CD | 58 | 94 |
| 37 | 31 | 59 | 3E |
| 38 | B5 | 5A | DA |
| 39 | D4 | 5B | 6A |
| 3A | 9F | 5C | C9 |
| 3B | 97 | 5D | EC |
| 3C | 29 | 5E | 8E |
| 3D | 7C | 5F | A |
| 3E | 3B | 60 | 12 |
| 3F | 72 | 61 | D7 |
| 40 | 6 | 62 | 45 |
| 41 | 7F | 63 | 54 |
| 42 | 48 | 64 | D2 |
| 43 | 5F | 65 | 7A |
| 44 | 36 | | |
| 45 | 23 | | |
| 46 | 6E | | |
| 47 | 89 | | |
| 48 | C2 | | |
| 49 | 2C | | |
| 4A | 57 | | |
| 4B | E1 | | |
| 4C | F1 | | |
| 4D | A4 | | |
| 4E | AC | | |
| 4F | 83 | | |

FIG. 8B

| | | | |
|---|---|---|---|
| 66 | 42 | 8A | 24 |
| 67 | FA | 8B | AF |
| 68 | BD | 8C | 6F |
| 69 | B8 | 8D | 2E |
| 6A | FD | 8E | 8A |
| 6B | 18 | 8F | A8 |
| 6C | CE | 90 | C3 |
| 6D | 9C | 91 | AE |
| 6E | 32 | 92 | 2D |
| 6F | 63 | 93 | A7 |
| 70 | B6 | 94 | 58 |
| 71 | 9A | 95 | 85 |
| 72 | D5 | 96 | E2 |
| 73 | 78 | 97 | F6 |
| 74 | A0 | 98 | F2 |
| 75 | E8 | 99 | F3 |
| 76 | 98 | 9A | A5 |
| 77 | E6 | 9B | F4 |
| 78 | 2A | 9C | AD |
| 79 | A2 | 9D | A6 |
| 7A | 7D | | |
| 7B | 21 | | |
| 7C | 3C | | |
| 7D | EA | | |
| 7E | 73 | | |
| 7F | 4C | | |
| 80 | 7 | | |
| 81 | 59 | | |
| 82 | 80 | | |
| 83 | 86 | | |
| 84 | 49 | | |
| 85 | E3 | | |
| 86 | 60 | | |
| 87 | F7 | | |
| 88 | 37 | | |
| 89 | C4 | | |

*FIG. 8C*

| | | | | |
|---|---|---|---|---|
| 9E | 84 | | C0 | 13 |
| 9F | F5 | | C1 | DC |
| A0 | 1F | | C2 | D8 |
| A1 | 4A | | C3 | 8C |
| A2 | 76 | | C4 | 46 |
| A3 | E4 | | C5 | 6C |
| A4 | 16 | | C6 | 55 |
| A5 | 61 | | C7 | AA |
| A6 | 52 | | C8 | D3 |
| A7 | F8 | | C9 | 96 |
| A8 | 68 | | CA | 7B |
| A9 | 8 | | CB | 71 |
| AA | 4F | | CC | 43 |
| AB | 5A | | CD | 40 |
| AC | DF | | CE | FB |
| AD | 81 | | CF | 30 |
| AE | 5D | | D0 | BE |
| AF | 87 | | D1 | 90 |
| B0 | 95 | | D2 | B9 |
| B1 | 70 | | D3 | 26 |
| B2 | 3F | | D4 | FE |
| B3 | 2F | | D5 | C |
| B4 | DB | | | |
| B5 | 8B | | | |
| B6 | 6B | | | |
| B7 | A9 | | | |
| B8 | CA | | | |
| B9 | 38 | | | |
| BA | ED | | | |
| BB | C5 | | | |
| BC | 8F | | | |
| BD | 25 | | | |
| BE | B | | | |
| BF | 20 | | | |

*FIG. 8D*

| | | | |
|---|---|---|---|
| D6 | 19 | F0 | 2B |
| D7 | B1 | F1 | E0 |
| D8 | CF | F2 | A3 |
| D9 | CB | F3 | 82 |
| DA | 9D | F4 | 7E |
| DB | 39 | F5 | 5E |
| DC | 33 | F6 | 22 |
| DD | EE | F7 | 88 |
| DE | 64 | F8 | 3D |
| DF | C6 | F9 | 69 |
| E0 | B7 | FA | EB |
| E1 | 17 | FB | 9 |
| E2 | 9B | FC | 74 |
| E3 | 62 | FD | 50 |
| E4 | D6 | FE | 4D |
| E5 | 53 | FF | 5B |
| E6 | 79 | | |
| E7 | F9 | | |
| E8 | A1 | | |
| E9 | 20 | | |
| EA | E9 | | |
| EB | 4B | | |
| EC | 99 | | |
| ED | 77 | | |
| EE | E7 | | |
| EF | E5 | | |

*FIG. 8E*

APPARATUS AND METHOD FOR PROVIDING DATA REDUNDANCY AND RECONSTRUCTION FOR REDUNDANT ARRAYS OF DISK DRIVES

BACKGROUND OF THE INVENTION

1. Field of the Invention

This invention relates generally to redundant storage and reconstruction of data in secondary data storage means and, in particular, to redundant storage and reconstruction of data in multiple arrays of disk drives.

2. Prior Art

Secondary storage is an integral part of most current computer systems. Although other storage devices exist (such as magnetic tape and flash memory chips), perhaps the most popular form of such storage has been the magnetic disk and its associated drive. Typically, most computer systems are characterized by a single, expensive magnetic disk capable of holding great quantities of data. This single disk normally is accessed by the Central Processing Unit (CPU) through a separate Direct Memory Controller (DMA). The DMA then translates and executes the Input/Output (I/O) requests of the CPU. Because a CPU clock cycle is a smaller time period than the mean access time in secondary storage, a CPU generally needs to wait for data to be retrieved from the disk before processing can resume.

As processing speeds have increased, however, the single, large disk method of implementing secondary storage has become increasingly unacceptable. Aggravating the situation, advancements in reducing the mean access time of single disks have not kept pace with the speed increases made in processing. As a result, I/O transfers now represent a major bottleneck in system throughput. In a typical unitasking environment, a CPU must sit idle for many clock cycles, waiting for data to be transferred from secondary storage to main memory.

One attempt to alleviate this bottleneck has focused on new architectures of secondary storage. Instead of a single, large disk, one such architecture distributes data among a large number of small disks that are grouped into a parallel array structure. The concept for this new architecture was first formalized in an article written by members of the Department of Electrical Engineering and Computer Sciences at the University of California at Berkeley, entitled: *A Case for Redundant Arrays of Inexpensive Disks (RAID)*, by David Patterson, Garth Gibson, and Randy Katz. Because each disk has a separate controller, the RAID architecture improves data transfer throughput by creating a large number of channels through which data flows concurrently.

The disadvantage of distributing data in a disk array structures is reliability. With a large number of disks in an array, the mean time for any one of those disks to fail is less than the mean time to fail for a single, large disk. Moreover, this probability of failure for a disk in an array increases as more disks are added to the array.

In an effort to improve reliability, Patterson et al. discuss partitioning the disks of the array structure into "groups." Within a group, the disks can be subdivided into disks that hold either commercial data or redundancy data. Commercial data is that produced by the end user of the computer system and stored for later recall. Redundancy data is derived from the commercial data by use of a mapping. Redundancy data facilitates the reconstruction of data when a disk failure occurs. In a typical scenario, if a disk in the array group should ever fail, the system can reconstruct the failed disk's data from the remaining accessible redundancy and commercial data stored on the other functioning disks.

In order to reconstruct lost data in a redundancy group, the system must define a reversible mapping from the commercial and redundancy data in the group to the lost data. Patterson et al. describe in their paper several such mappings. The desirability of these mappings differ according to the expected use of the system. One mapping might be preferred for an archival backup system that stores lengthy records for long periods of time without change. Another mapping is more appropriate for a database transaction system that is characterized by many read/modify/write requests on small units of datum stored on the disk.

One such mapping, termed RAID level 4 (RAID-4) by Patterson et al., defines a group as an arbitrary number of commercial disks and a single redundancy disk. Under RAID-4, bytes of commercial data are stored at particular physical locations on the commercial disks. The system takes the exclusive-or of all bytes found at the same physical location on all the commercial disks and stores the result at the corresponding location on the redundancy disk. Later, if a single disk should fail, its data can be reconstructed by taking the exclusive-or of the data on the remaining functional disks.

Another mapping, RAID level 5 (RAID-5), is a paradigm that is better suited to the database transaction system described above. Under RAID-5, all the commercial data and redundancy data are distributed per sector across all the disks—i.e. no single disk is dedicated as the redundancy disk. For example, sector 0 on disk 5 might be designated as the redundancy sector for the group whereas sector 1 on disk 2 might be designated as the redundancy sector, etc. The advantage in interleaving the redundancy data sector-by-sector is that multiple updates to the redundancy data can be done concurrently. Under RAID-4 where there is a single, designated redundancy disk, only sequential access to the redundancy data is allowed. If the commercial data is volatile, such as in a database transaction system, then concurrent updating, allowed by RAID-5, is highly desirable.

The RAID levels, defined by Patterson et al., allow for recovery of data from a single failed disk. However, if two or more disks fail simultaneously, another paradigm is required. Such an approach is described in European Patent Application Number 89311715.0 by Gordon et al. assigned to Array Technology Corporation. Gordon et al. describe a double redundancy means wherein a group of disks has two redundancy disks, instead of one. The first redundancy means is equivalent to those as described above. Specifically, the first means takes the exclusive-or of all commercial data disks, sector by sector, and stores the results in the first redundancy disk into its corresponding sector.

The second redundancy means uses a well known technique, called the Reed-Solomon algorithm, that allows for reconstruction of data when two disks fail. Basically, the algorithm provides a sufficient mapping of the commercial data to the redundancy data such that if two disks were to fail simultaneously, the data from those disks could be reconstructed from the remaining functional disks.

Although Gordon et al. do not describe the mathematical underpinnings of their second redundancy means, an exposition of a similar algorithm is provided in the article: *Two-Level Coding for Error Control in Magnetic Disk Storage Products*, by Arvind M. Patel, which is herein incorporated by reference. While Patel's algorithm pertains to two level redundancy within a single disk drive, the present invention implements and improves upon the Patel algorithm in the domain of multiple disk drives. The algorithm describes a mapping of commercial data into redundancy data in such a way as to guarantee data reconstruction from two failed disks. The crux of this mapping is the use of a primitive polynomial, P(X), of degree N, where N is some positive integer greater than 1. An N×N companion matrix, $T^1$, to the polynomial P(X) forms a cyclic group of order $(2^N)-1$ under matrix multiplication modulo 2. This cyclic group is mathematically denoted as:

$$\{T^i | 1 \leq i \leq (2^N)-1\} \quad (1)$$

Additionally, this group, together with the zero matrix forms a Galois field of order $2^N$, $GF(2^N)$ under matrix multiplication and matrix addition modulo 2. The non-zero matrices of this field provide the necessary mapping of the commercial data onto the redundancy data. The algorithm and its implementation, as well as a more complete mathematical discussion, is provided in greater detail below.

SUMMARY OF THE INVENTION

The present invention provides a system of hardware and software that combine to form a redundant array of disk drives. This array provides a double means of redundancy that can reconstruct data from two simultaneously failed disks. The double redundancy means is implemented by two separate algorithms, DRR1 and DRR2. DRR1 takes the exclusive-or of all the commercial data and stores the result as redundancy data. DRR2 is similar to the algorithm described in Patel's article. As an additional feature, the implementation of DRR1 and DRR2 in the present invention is flexible enough to support either RAID 4 or RAID-5 level operation.

Although both DRR1 and DRR2 algorithms are in the prior art, the present invention improves on the run-time and space requirements of the algorithm. This improvement arises because of a novel relationship, discussed below, that exist between the individual $T^i$ matrices and their column vectors that allows for a savings in computing the mapping of the commercial data to the redundancy data. This unique relationship is incorporated into the present systems hardware and software.

BRIEF DESCRIPTION OF THE DRAWINGS

The accompanying drawings, which are incorporated in and form a part of this specification, illustrate embodiments of the invention and, together with the description, serve to explain the principles of the invention, wherein:

FIGS. 7A–7E are anti-log tables for use in calculating the DRR coefficients in accordance with the principles of the present invention.

FIGS. 8A–8E are log tables for use in calculating the DRR coefficients in accordance with the principles of the present invention.

FIG. 10 shows a block diagram of the circuitry that computes the next column entry in an individual T matrix.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Overview of the System Architecture

Figure 1:
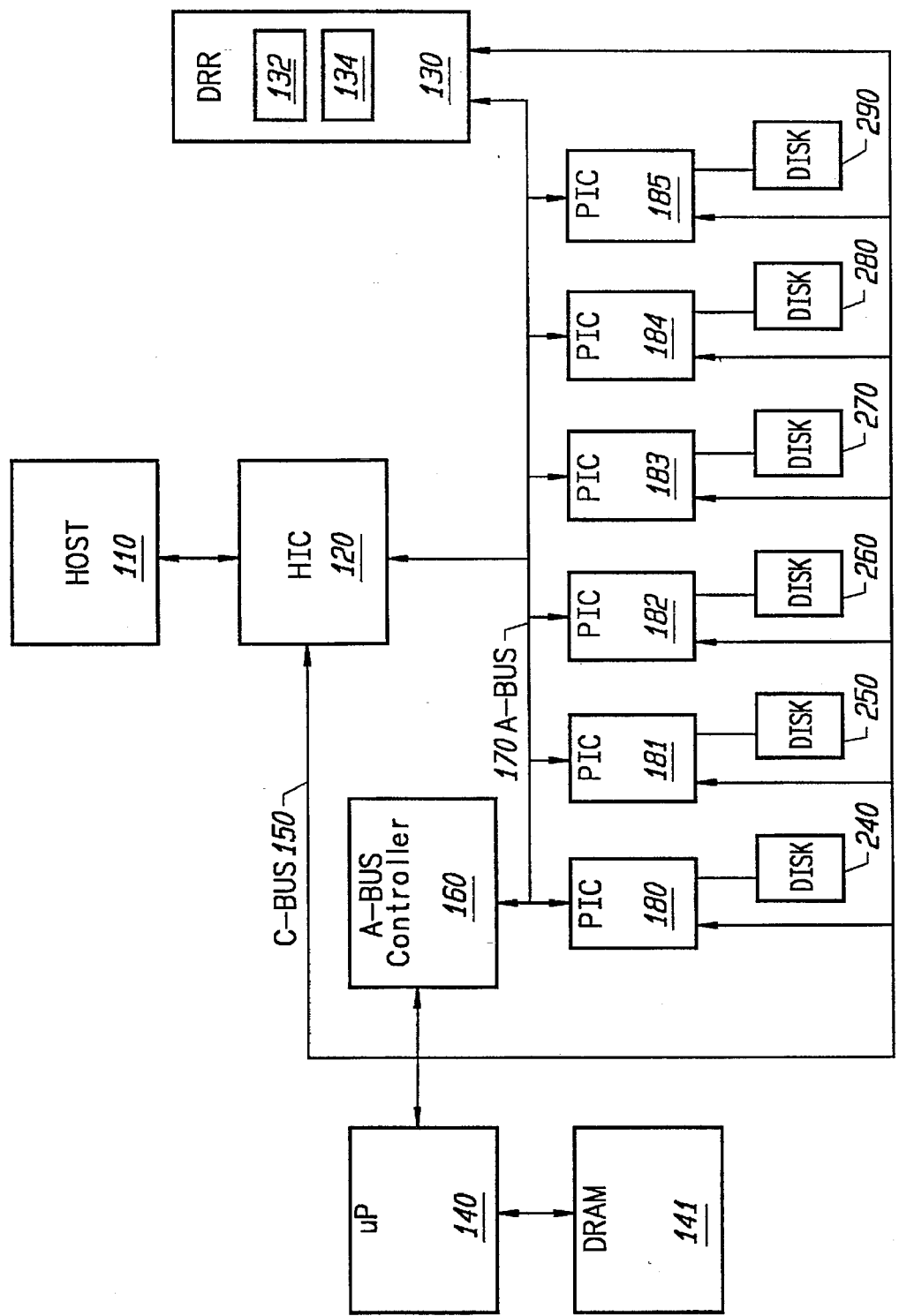
FIG. 1 shows a high level block diagram of the architecture of a redundant array of disk drives built in accordance with the principles of the present invention.

Referring now to FIG. 1, a high level block diagram of the architecture of a redundant array of disk drives is shown as currently practiced by the present invention. Host Interface Controller (HIC) 120 connects a host processor 110 to a redundant array of disk drives. Two separate buses are used to connect the various modules of the system. The command bus, C-Bus 150, connects and sends control signals to HIC 120, Data Redundancy and Reconstruction module (DRR) 130, A-Bus Controller (ABC) 160, microprocessor (µP) 140 and each individual Peripheral Interface Controller (hereinafter "PIC") 180, 181, 182, 183, 184, 185. The data bus, A-Bus 170, connects and transmits data to HIC 120, DRR 130, µP 140 and each individual PIC 180, 181, 182, 183, 184, 185. Individual disk drives 240, 250, 260, 270, 280, 290 are shown connected in a one-to-one correspondence with PIC 180, 181, 182, 183, 184, 185 respectively. It will be appreciated that there may be several disk drives that connect to each individual PIC and that the one-to-one correspondence as shown in FIG. 1 should not be construed as a limitation of the present invention. Indeed, the presently preferred embodiment of the present invention supports one to seven disks per PIC.

It will also be appreciated that the methods of data redundancy and reconstruction as embodied in the present invention can be employed on arrays of other storage devices, such as optical disks, magnetic disks, magnetic tape, or flash memory chips.

The present invention can partition the set of disks into those disks that contain only commercial data and those disks that contain only redundant data. Alternatively, both commercial and redundancy data may be striped across all the disks in the array. In the preferred embodiment, two redundancy disks are provided for each array group. The two redundancy disks are used to implement a separate first and second redundancy means, DRR1 and DRR2, in the present invention. Both DRR1 and DRR2 means are implemented by a combination of the software resident at DRAM 141 executed by microprocessor 140 and specialized hardware located in DRR 130.

Overview of DRR1 and DRR2 Algorithms

DRR1 and DRR2 algorithms will now be discussed. It will be appreciated that the DRR1 algorithm is in the prior art and, therefore, is not claimed as subject matter of the present invention. The DRR2 algorithm, in its broadest sense, is also in the prior art and, to that extent, is also not claimed. There are improvements to the DRR2 algorithm, however, which improve the run-time characteristics of the algorithm. These improvements are embodied in both the hardware and software of the present invention.

Both DRR1 and DRR2 means have a construction phase and a reconstruction phase. The construction phase generally performs the mapping of commercial and other data to create redundancy data. The reconstruction phase generally performs the inverse mapping of redundancy data to commercial and other data. Construction is performed as new commercial data is either stored for the first time or is subsequently updated by the system. Reconstruction occurs when either a single disk fails or two disks fail concurrently.

DRR1 alone may reconstruct data from a single failed disk. If two disks, however, fail concurrently, their data can be reconstructed by executing DRR2 first then executing DRR1 using the results of DRR2. If more than two disks fail concurrently, then the data from these disks are not reconstructible in the preferred embodiment. However, it will be appreciated that the methods presented in the present invention may be extended to handle the reconstruction of N failed disks in an array group if N redundant disks are provided.

In the preferred embodiment of the present invention, the system is configurable so that an end user may specify that its commercial data be reconstructible from either a single or a double disk failure. If the end user specifies that its commercial data be reconstructible from only a single disk failure, then only the DRR1 construction phase will be executed when that end user's commercial data is stored. Otherwise, both DRR1 and DRR2 construction phases will be executed.

Additionally, the DRR1 and DRR2 implementations are flexible enough to support both RAID 4 and RAID-5 paradigms according to either system or end user demands. If RAID 4 paradigm is to be implemented, then two disks are dedicated to storing the redundancy data for the array group. If RAID-5 is specified, then no disk is dedicated; but all data, commercial and redundancy, is striped across all the array disks.

DRR1 Algorithm

The DRR1 algorithm takes the exclusive-or of all the commercial data symbols in the group and stores the result in the corresponding redundancy sector. To support both on-the-fly redundancy generation and read-modify-write paradigms, DRR1 algorithm has two separate branches for its software implementation. To support on-the-fly generation, DRR1 code is expressed mathematically as follows:

$$S_{i_o} = \sum_{j=0, j \neq i_o}^{m-1} S_j \text{ where} \tag{2}$$

$S_{i_o}$=symbol being (re) constructed in DRR1
$S_j$=current symbol
m=number of symbols in the group It will be understood that all sums in this disclosure refer to logical "exclusive-or" operations and all multiplications in this disclosure refer to logical "and" operations respectively unless otherwise expressed. The number m is equal to the total number of symbols in an array group, which also equals the number of disks in the group. The variable $i_o$ refers to a particular disk. If DRR1 is being executed during the construction phase (write phase), then $i_o$ refers to the disk used to store redundancy data.

Figure 2:
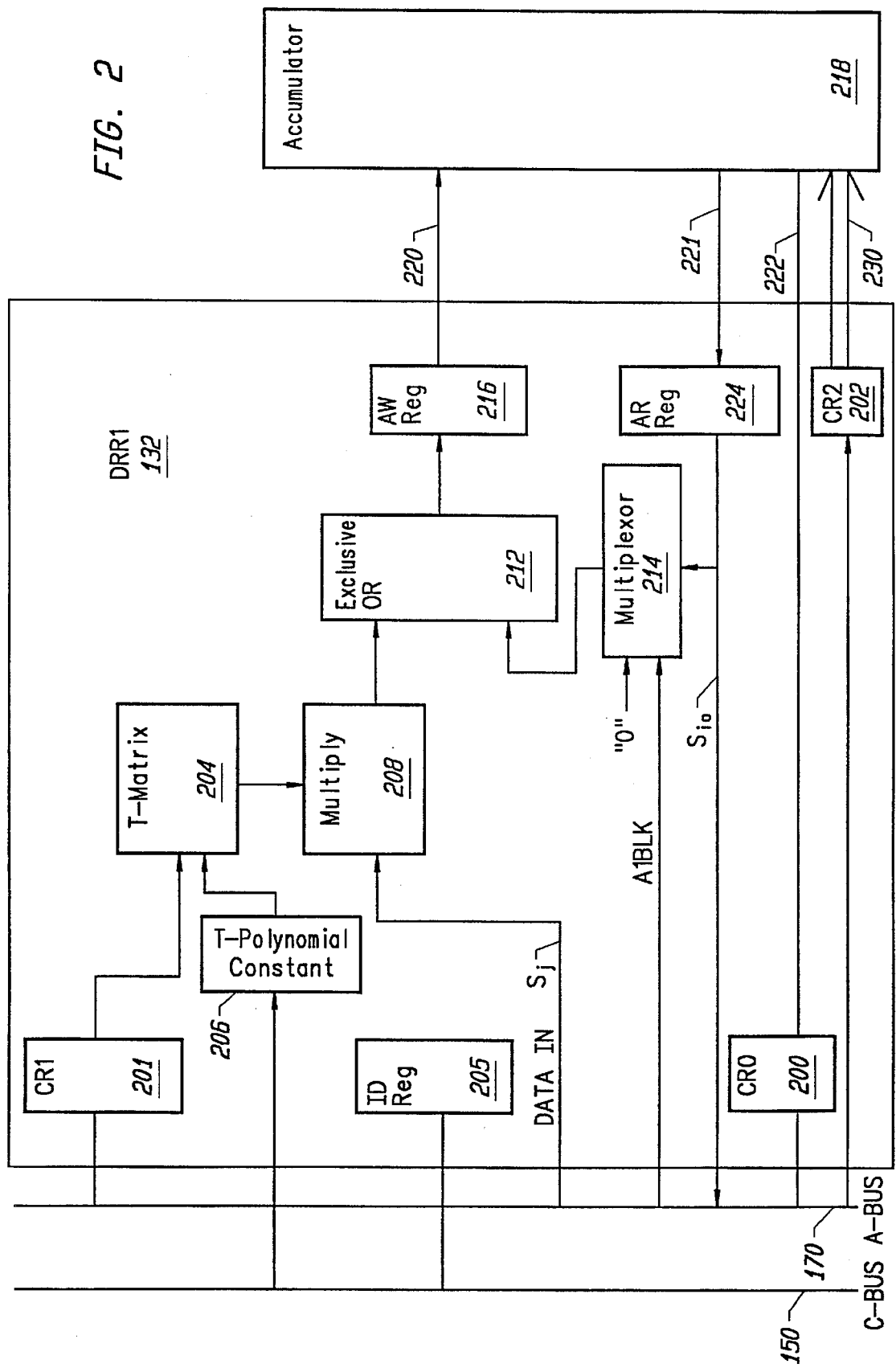
FIG. 2 shows a block diagram of the DRR1 Application Specific Integrated Circuit ASIC chip that computes the mapping of commercial data to redundancy data during the storing of said commercial data and computes the inverse mapping for reconstructing data from one failed disk.

Referring now to FIG. 2, the DRR1 algorithm as implemented by the preferred embodiment of present invention is shown. DRR module 130 contains two identical ASIC chips 132, 134 that implement the above relationship. One chip is configured for DRR1 calculations while the other chip computes DRR2 by externally programming an ID register 205, 405 for each ASIC. In operation, the host 110 typically passes requests for certain read/write operations for an associated array of drives to HIC 120. These requests are for data that reside in logical blocks addresses. HIC 120 then passes along these requests to μP 140 via C-Bus 150. μP 140 decides whether the requested logical block resides in the present array of disks. If so, an I/O request is issued to the appropriate PIC via A-Bus Controller 160 along A-Bus 170. In the case of a read request, if the drive in question is functioning, then the data to be read is passed along A-Bus 170 from the appropriate PIC to HIC 120 and back to host 110.

However, if the disk drive to be accessed has suffered a complete failure, the appropriate PIC contains sufficient control lines to note the failure. This information is reported back to μP 140 and A-Bus controller 160. Thus, even before a read/write request is made by host 110, the system has knowledge of which disk's data, if any, needs to be reconstructed. If host 110 subsequently makes a read request to a malfunctioning disk, then the data is reconstructed by the DRR1 and DRR2 software resident in DRAM 141 and by hardware resident in DRR module 130.

DRR1 module 132 is comprised of three 16 bit control registers (CR0) 200, (CR1) 201 and (CR2) 203 for receiving control words from the A-bus controller 160. The control words are generated by μP 140. CR1 is coupled to a T-matrix module 204 which also receives an input from an 8 bit T-polynomial Constant register 206.

The T-matrix module 204 receives two inputs, a constant value ($A9_h$) stored in the T-polynomial constant register 206 and an 8 bit DRR coefficient stored in CR1 201. The T-matrix module translates the 8 bit DRR coefficient into a 8×8 matrix which is uniquely mapped to the input DRR coefficient. Details of the mapping will be explained in greater detail below in conjunction with the DRR2 module 134. In the DRR1 module, the DRR coefficient input from the μP 140 to CR1 is held constant at a value $01_h$, thereby driving the output of the T-matrix to an 8×8 identity matrix for all DRR1 operations. Again, the hardware implementation which results in the identity matrix output will be explained in greater detail in conjunction with the DRR2 module 134 described below.

The output of the T-matrix Module 204 is coupled to one input of a multiplier 208. An input data word comprising 8 bit data from the A-bus 170 is coupled to the second input of the multiplier 208. As described above, in the DRR1 module 132 the output of the T-matrix module is held constant as an 8×8 identity matrix. As such the output of the multiplier module 208 will always track the input data word for all DRR1 module operations. The output of the multiplier 208 is coupled to a first input of a bit wise exclusive-or module 212, whose second input is provided by the output of multiplexor 214. The output of the bit-wise exclusive-or module 212 is coupled to an accumulator write register 216 whose output is coupled to the accumulator 218 via the accumulator write bus (I/O) 220. CRO 200 is coupled to the accumulator 218 via accumulator address bus 222 for identifying the location in the storage device (accumulator) which is to be loaded with the data output from the accumulator write register 216.

The accumulator 218 provides resultant data via the accumulator read bus (SI/O) 221 as an input to the DRR1 module 132 at the accumulator read register 224, whose output is tied to both the first input of the multiplexor 214 and to the A-bus 170. A hardwired 8 bit "0" input is coupled to the second input of multiplexor 214. Multiplexor 214 receives a hardware control signal A1BLK from the A-bus controller 160 which indicates when a first block of data is to be operated on, so as to allow the selection of the second input to be outputted by multiplexor 214. Accordingly, the first block of data received to be processed through the exclusive-or module 212 will be exclusive-or'ed with a "0" byte, resulting in the unaltered passage of the first block directly to the accumulator.

Figure 3:
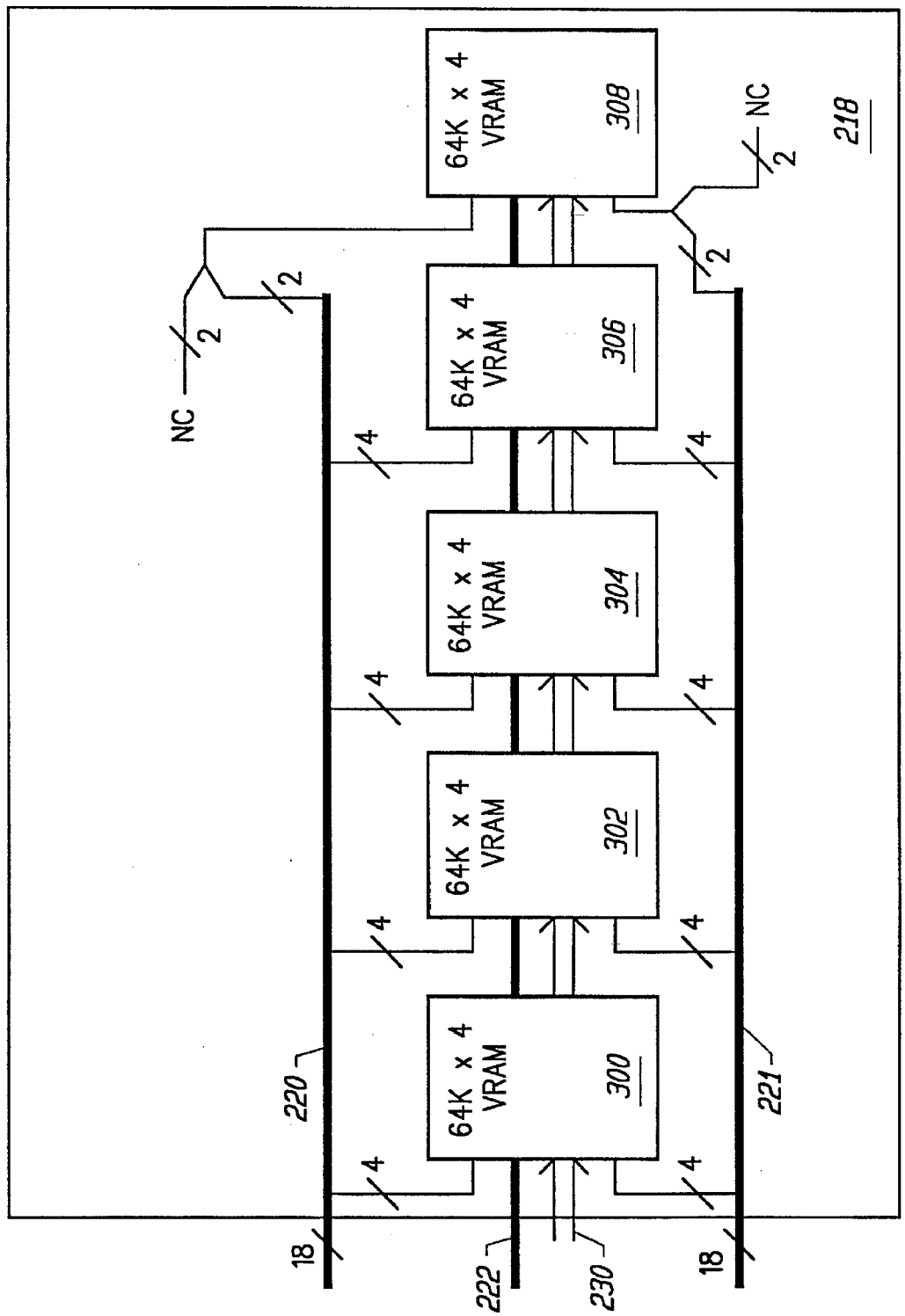
FIG. 3 shows the accumulator for storing the partial results of the calculations performed by the DRR1 ASIC chip in accordance with the principles of the present invention.

Referring now to FIG. 3, the accumulator 218 is shown, comprising five identical 64k by 4 Video RAM chips (VRAM) 300, 302, 304, 306 and 308. Accumulator write bus 220 is coupled 4 bits at a time to the I/O data buffer for each successive VRAM chip 300, 302, 304 and 306. The 2 most significant bits of the I/O bus 220 (representing data parity for the data transferred between the accumulator and the DRR module on the I/O bus) are coupled to the fifth VRAM chip 308, leaving two bits of the four bit VRAM input unconnected in this configuration. Similarly the accumulator read bus 221 is connected 4 bits at a time to the SI/O data buffer for each successive VRAM 300, 302, 304 and 306. Again, VRAM 308 provides two parity bits associated with the transfer out of the accumulator, with the remaining two output bits from VRAM 308 being unconnected. The location in the accumulator 218 for storage of data passed via the accumulator write bus 220 from the DRR1 module, or of data to be read from the accumulator 218 via the accumulator read bus 221 to the DRR1 module 132, is designated by addresses passed on the accumulator address bus 222. Accumulator control signals 230 generated by the DRR1 ASIC 132 enable the accumulator in a read or write mode and also designate refresh strobes for the rows and columns of the VRAM chips 300, 302, 304, 306 and 308.

The DRR1 module 132 operates in substantially three different run modes: construction, refresh and reconstruction. For the purposes of this disclosure a RAID 4 type of architecture will be described in which an array comprised of m discs, labeled 0, 1, 2 ... m-1, includes disc 0 and disc 1 for maintaining redundancy data DRR1 and DRR2 respectively. In addition, it will be assumed that the user has elected to only utilize the single DRR1 redundancy function of the DRR module 130. The selection of double redundancy and its effect on the DRR1 redundancy operation will be explained in greater detail in the accompanying text describing the DRR2 module 134 below. Those ordinarily skilled in the art will recognize that the apparatus and method described will work equally well in a RAID5 or other architecture and as such, the disclosure of a RAID4 implementation should not be construed as limiting.

In the construction mode, the DRR1 ASIC 132 receives data from the Host 120 via the host interface controller 120 on the A-bus 170. The A-bus controller initiates the construction mode designating the DRR1 ASIC 132 as a destination and generates the control words for configuring the DRR1 ASIC 132 based on inputs received from the microprocessor 140. The control words designate what starting address in the accumulator is to be accessed and also the DRR coefficient associated with DRR1 ASIC 132 which is to be loaded into CR1 201 of the DRR1 ASIC 132. A first block signal A1BLK is generated by the A-bus controller 160 and is passed to the DRR1 ASIC 132. The A-bus controller 160 thereafter initializes the first block of data from the HIC 120 to be loaded onto a first location in the disc array 260 via PIC 200 and into the DRR1 ASIC 132.

The first block of data is transferred from the A-bus 170 into the multiplier module 208. A multiplication by a 8×8 identity matrix generated by the T-matrix module results in the first block of data passing unchanged to the exclusive-or module 212. As was described above, the A1BLK line is set, thereby selecting a "$00_h$" output from multiplexor 214, again resulting in the first block of data passing unchanged through the exclusive-or module to the accumulator write register (AW reg) 216. The address associated with the location in the accumulator to be accessed is transferred via the accumulator address bus 222, along with a write enable to the accumulator 218 in order to store the first partial result $s_j$ from the DRR1 calculations per equation 2.

The second block of data is then initialized and transferred via the A-bus 170 from the host 120 into both the second data array 270 via PIC 210 and the input into the DRR1 module 132. The second block of data is transferred from the a-bus 170 into the multiplier module 208. A multiplication by a 8×8 identity matrix generated by the T-matrix module results in the second block of data passing unchanged to the exclusive-or module 212. The A-bus controller initializes the transfer of the first partial result $s_j$ from the accumulator 218 to the accumulator read register 224 in the DRR1 module 132. This is accomplished by loading the address of the first partial result data $s_j$ stored in the accumulator into the DRR1 module, and thereafter enabling the accumulator 218 so as to read the data from the accumulator 218 into the accumulator read register 224 in the DRR1 module 132 via the accumulator read bus 221. The first partial result $s_j$ is selected as the output from the multiplexor 214, which is thereafter operated on with the second block of data by the exclusive-or module 212. The next partial result $s_j$ is then written as the output of the exclusive-or module 212 to the accumulator write register 216, ultimately destined for transfer to the accumulator 218 at the designated partial result address location.

This process is repeated for each subsequent block of data, until the last block of data in the group is transferred from the host 120 to the DRR1 module and stored at its respective disk array location. When the last block of data is transferred and the exclusive-or module has performed the last exclusive-or operation with the preceding partial result $s_j$, then the final result $s_{i_o}$ is read back onto the A-bus 170 via the accumulator 218 and accumulator read register 224 to be written to the corresponding memory location on disc 0 (240) of the disc array via the PIC 180. The $s_{i_o}$ value is stored as the DRR1 redundancy data for the particular group of data.

The refresh mode is initialized upon the updating of any data location belonging to a group which has already constructed DRR1 redundancy data. To maintain redundancy, a read-modify-write operation is performed on both the data symbol and on the DRR1 redundancy symbol. The new DRR1 symbol is computed as the parity of the old data, old DRR1 symbol, and new data. This relationship is expressed mathematically as:

$$S_{i_o}(\text{new}) = S_j(\text{old}) + S_{i_o}(\text{old}) + S_j(\text{new}) \quad (3)$$

where $S_{i_o}$ = redundancy symbol being modified in DRR1
$S_j$ = data symbol being modified Accordingly, the old data (symbol) which is to be modified $s_j$ (old) is read from disc j and transferred by the A-bus controller 160 via the A-bus 170 to the DRR1 module 132. The A-bus controller sets the first block line A1BLK, thereby allowing the $s_j$ (old) symbol to pass directly to the accumulator 218 as the first partial result. Thereafter the old redundancy data $s_{i_o}$ (old) is read from disc 0 (240) in the disc array, and transferred to the DRR1 module as a second block of data by the A-bus controller 160 via the A-bus 170. This second data byte $s_{i_o}$ (old) is then exclusive-or'ed with the first partial result from the accumulator [$s_j$ (old)] by the exclusive-or module 212 with the partial result again transferred to the accumulator 218 for temporary storage. Finally, the A-bus controller 160 initializes the host to write the new data $s_j$ (new) to both the j disc and also to the DRR1 module 132. The $s_j$ (new) data is exclusive-or'ed with the partial result stored in the accumulator 218, thereby generating the new redundancy data $s_{i_o}$ (new), which is passed via the accumulator to the A-bus 170 for writing to the appropriate location on disc 0 as the new DRR1 redundancy data.

The reconstruction mode rebuilds data in the event of a single failed disc as evidenced by a parity error, or other disc failure. Reconstruction is performed by executing formula 2 above and solving for $s_{i_o}$ as the symbol to be reconstructed. Accordingly, the first valid data symbol $s_j$ is read by the A-bus controller 160 from a first disc j (where $j \neq i_o$) in the disc array into the DRR1 module 132.

The first valid data symbol $s_j$ is transferred from the A-bus 170 into the multiplier module 208. A multiplication by a 8×8 identity matrix generated by the T-matrix module results in the first valid data symbol $s_j$ passing unchanged to the exclusive-or module 212. As was described above, the A1BLK line is set, thereby selecting a "$00_h$" output from multiplexor 214, again resulting in the first valid data symbol $s_j$ passing unchanged through the exclusive-or module to the accumulator write register 216. The destination address in the accumulator is transferred via the accumulator address bus 222, along with a write enable to the accumulator 218 in order to store the first partial result $s_j$ from the DRR1 calculations per equation 2.

The second valid data symbol $s_j$ is initialized and transferred via the A-bus 170 from the host 120 into the DRR1 module 132. The second block of data is transferred from the A-bus 170 into the multiplier module 208. A multiplication by a 8×8 identity matrix generated by the T-matrix module results in the second block of data passing unchanged to the exclusive-or module 212. The A-bus controller initializes the transfer of the first partial result $s_j$ from the accumulator 218 to the accumulator read register 224 in the DRR1 module 132. This is accomplished by loading the address of the first partial result data $s_j$ stored in the accumulator into the DRR1 module, and thereafter enabling the accumulator 218 so as to read the data from the accumulator 218 into the accumulator read register 224 in the DRR1 module 132 via the accumulator read bus 221. The first partial result $s_j$ is selected as the output from the multiplexor 214, which is thereafter operated on with the second block of data by the exclusive-or module 212. The next partial result $s_j$ is then written as the output of the exclusive-or module 212 to the accumulator write register 216, ultimately destined for transfer to the accumulator 218 at the designated partial result address location.

This process is repeated for each subsequent valid symbol $s_j$. As a last step, the DRR1 data symbol constructed in the construction mode above $s_{i_o}$ (old) is read as the last block of data in the group and transferred from the DRR1 redundancy disc 0 to the DRR1 module 132 for processing. When this last block of data is transferred and the exclusive-or module has performed the last exclusive-or operation with the preceding partial result $s_j$, the resultant data $s_{i_o}$ from equation 2 above is the new reconstructed data to be restored to disc $i_o$. The final result $s_{i_o}$ is read back onto the A-bus 170 via the accumulator 218 and accumulator read register 224 to be written to the corresponding memory location on disc $i_o$ of the disc array via PIC $i_o$.

DRR2 Algorithm

Before discussing the implementation of DRR2 for both on-the-fly and read-modify-write paradigms, a little mathematical background is necessary in order to more clearly describe both the algorithm and the unique implementation of the present invention. Like Patel's algorithm, the present invention uses the primitive polynomial, $P(X) = 1 + x^3 + x^5 + x^7 + x^8$, of degree 8. An 8×8 companion matrix, $T^1 = (t_{ij})$, is formed from P(X) and is expressed as:

| 0 | 0 | 0 | 0 | 0 | 0 | 0 | 1 |
|---|---|---|---|---|---|---|---|
| 1 | 0 | 0 | 0 | 0 | 0 | 0 | 0 |
| 0 | 1 | 0 | 0 | 0 | 0 | 0 | 0 |
| 0 | 0 | 1 | 0 | 0 | 0 | 0 | 1 |
| 0 | 0 | 0 | 1 | 0 | 0 | 0 | 0 |
| 0 | 0 | 0 | 0 | 1 | 0 | 0 | 1 |
| 0 | 0 | 0 | 0 | 0 | 1 | 0 | 0 |
| 0 | 0 | 0 | 0 | 0 | 0 | 1 | 1 |

It will be appreciated that the last column of $T^1$ represents the coefficients of P(X), with the ones coefficient equal to the $t_{18}$ element and the $x^7$ coefficient as the $t_{88}$ element.

It can be shown that this matrix $T^1$ forms a cyclic group of order $(2^8) - 1 = 255$ under modulo 2 matrix multiplication. This group is denoted as:

$$\{T^i | 1 \leq i \leq (2^N) = 1\} \quad (4)$$

where $T^i$ denotes T multiplied by itself i times. It can be shown that the matrices $T, T^2, T^3, \ldots, T^{255}$ are all distinct, and that $T^{255}$ is the identity matrix. The identity matrix is also denoted as $T^0$. This group, together with the zero matrix forms a Galois field of order $2^8 = 256$, denoted as $GF(2^8)$, under modulo 2 matrix multiplication and addition. It is the nonzero matrices that are used to provide the mapping of commercial data symbols to redundancy data symbols. In the preferred embodiment, a data symbol is an 8-bit byte.

It can also shown that the elements of $GF(2^8)$ can be uniquely identified by any specified fixed column of the T-matrices. In the preferred embodiment, the first column of each T-matrix is used to identify the matrix. This establishes a one-to-one correspondence between the set of first column vectors and the set of T-matrices.

It will be appreciated that different primitive polynomials of different degrees can be chosen to produce other Galois fields of different orders and that the particular choice of P(X) of degree 8 should not be considered a limitation on the scope of the present invention.

The particular choice of 8 for the degree of P(X), and thus the dimension of the square companion matrix $T^1$, however, facilitates the implementation of the preferred embodiment. For example, the 8×8 matrix makes the choice of an 8 bit data symbol as the smallest unit of data in the system obvious. The 8 bit data symbols multiply the 8×8 matrices, $T^i$, evenly. Additionally, the choice of 8 for the degree of P(X) places an upper bound of 255 for the number of disks that can be placed in an array group. This is so because the 255 nonzero matrices may only uniquely code the commercial data from 255 disks—i.e. the coding for any number of disks greater than 255 loses its uniqueness.

Figure 4:
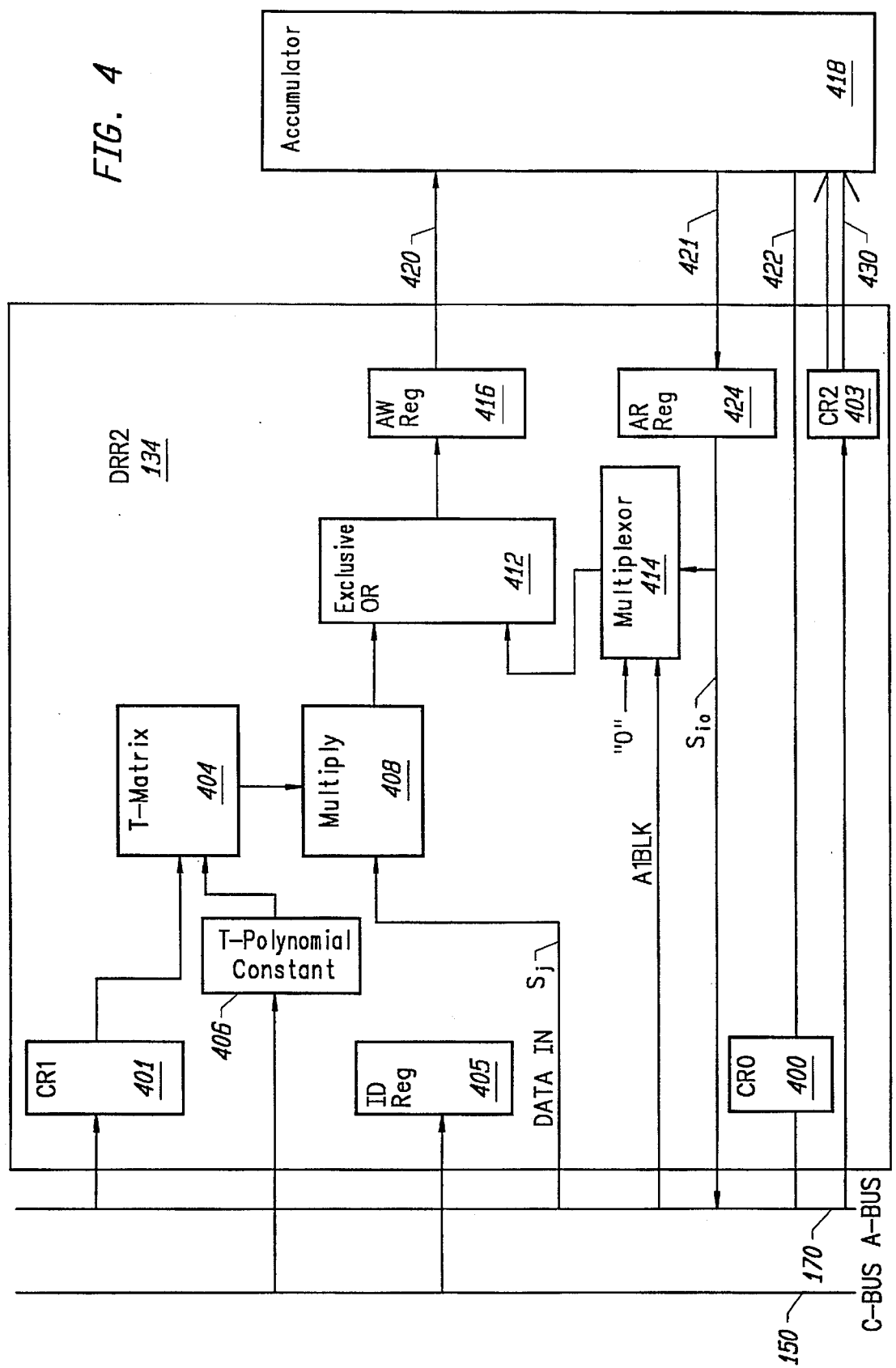
FIG. 4 shows a block diagram of the DRR2 ASIC chip that computes the mapping of commercial data to redundancy data during the storing of said commercial data and computes the inverse mapping for reconstructing data from a second failed disk.

Referring now to FIG. 4, the DRR2 algorithm as implemented by the preferred embodiment of present invention is shown. DRR2 module 134 is comprised of three 16 bit control registers (CR0) 400, (CR1) 401 and (CR2) 403 for receiving control words from the A-bus controller 160. The control words are generated µP 140. CR1 is coupled to a T-matrix module 404 which also receives an input from an 8 bit T-polynomial Constant register 406.

The T-matrix module 404 receives two inputs, a constant value $A9_h$ stored in the T-polynomial constant register 406 and an 8 bit DRR coefficient stored in CR1 401. The T-matrix module translates the 8 bit DRR coefficient into a 8×8 matrix which is uniquely mapped to the input DRR coefficient. The details of the mapping will be described in greater detail below.

The output of the T-matrix Module 404 is coupled to one input of a multiplier 408. Input data in the form of 8 bit data words transferred via the A-bus 170 are coupled to the second input of the multiplier 408. The output of the multiplier 408 is coupled to a first input of a bit wise exclusive-or module 412, whose second input is provided by the output of multiplexor 414. The output of the bit-wise exclusive-or module 412 is coupled to an accumulator write register 416 whose output is coupled to the accumulator 418 via the accumulator write bus (I/O) 420. CR0 is coupled to the accumulator 418 via accumulator address bus 422 for identifying the location in the storage device (accumulator) which is to be loaded with the data output from the accumulator write register 416.

The accumulator 418 provides resultant data via the accumulator read bus (SI/O) 421 as an input to the DRR2 module 134 at the accumulator read register 424, whose output is tied to both the first input of the multiplexor 414 and to the A-bus 170. A hardwired 8 bit "0" input is coupled to the second input of multiplexor 414. Multiplexor 414 receives a hardware control signal A1BLK from the A-bus controller 160 which indicates when a first block of data is to be operated on, so as to allow the selection of the second input to the output of the multiplexor 414. Accordingly, the first block of data received to be processed through the exclusive-or module 412 will be exclusive-or'ed with a "0" byte, resulting in the unaltered passage of the first block directly to the accumulator.

Figure 5:
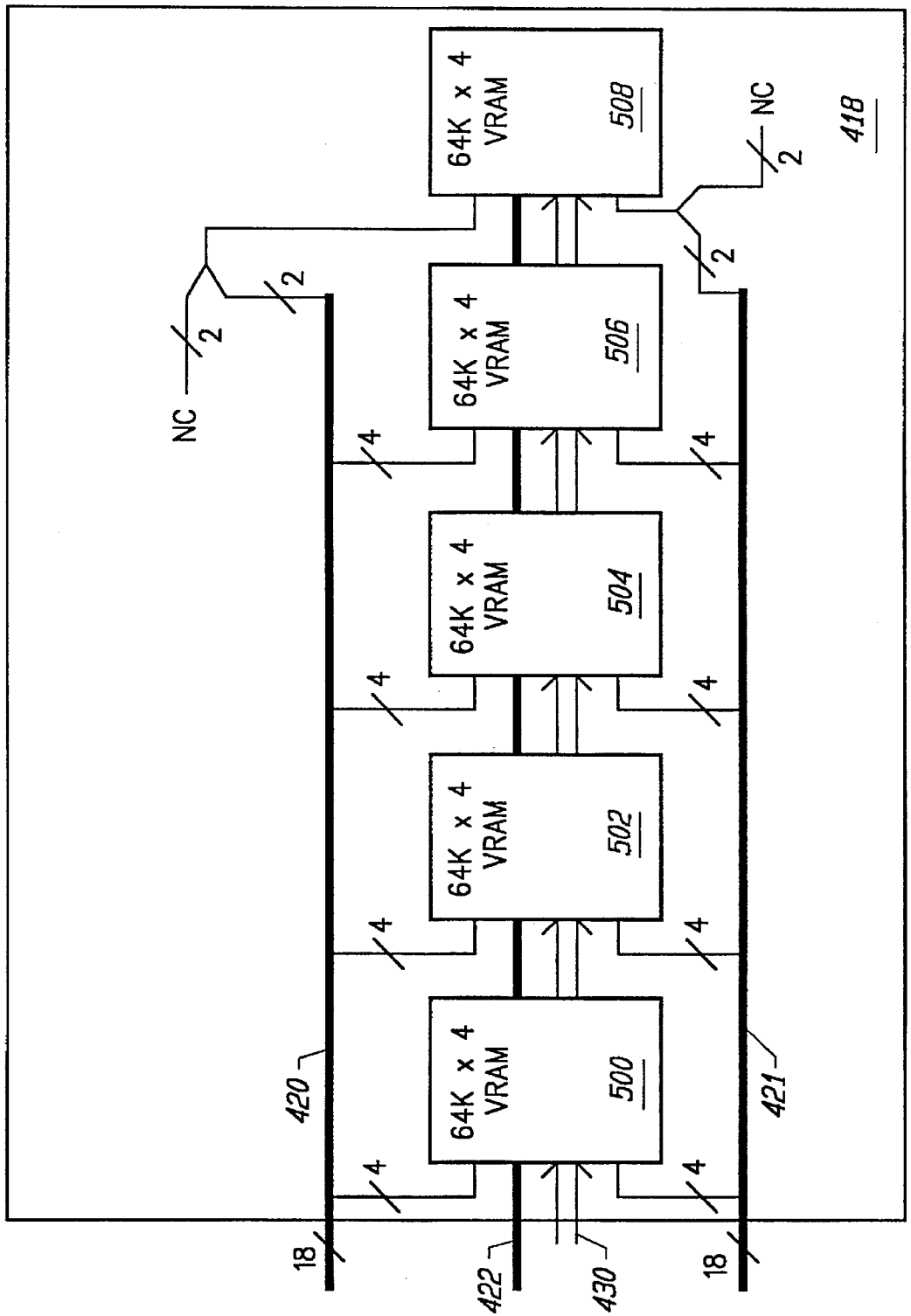
FIG. 5 shows the accumulator for storing the partial results of the calculations performed by the DRR2 ASIC chip in accordance with the principles of the present invention.

Referring now to FIG. 5, the accumulator 418 is shown, comprising five identical 64k by 4 Video RAM chips (VRAM) 500, 502, 504, 506 and 508. Accumulator write bus 420 is coupled 4 bits at a time to the I/O data buffer for each successive VRAM chip 500, 502, 504 and 506. The 2 most significant bits of the I/O bus 420 (representing data parity for the data transferred between the accumulator and the DRR module on the I/O bus) are coupled to the I/O data buffer on the fifth VRAM chip 508, while two of the four input bits are un-used in this configuration. Similarly the accumulator read bus 421 is connected 4 bits at a time to the SI/O data buffer for each successive VRAM 500, 502, 504 and 506. Again, VRAM 508 provides two parity bits associated with the transfer out of the accumulator, with the remaining two output bits from VRAM 508 being unconnected. The location in the accumulator 418 for storage of data passed via the accumulator write bus 420 from the DRR2 module, or of data to be read from the accumulator 418 via the accumulator read bus 421 to the DRR2 module 134, is designated by addresses passed on the accumulator address bus 422. Accumulator control signals 430 generated by the DRR2 ASIC 134 enable the accumulator in a read or write mode and also designate refresh strobes for the rows and columns of the VRAM chips 500, 502, 504, 506 and 508.

The DRR2 module 134 operates in substantially three different run modes: construction, refresh and reconstruction, For the purposes of this disclosure a RAID 4 type of architecture will be described in which an array comprised of m discs, labeled 0, 1, 2, ... m-1, includes disc 0 and disc 1 for maintaining redundancy data DRR1 and DRR2 respectively. Those ordinarily skilled in the art will recognize that the apparatus and method described will work equally well in a RAID5 or other architectures and as such, the disclosure of a RAID4 implementation should not be construed as limiting.

To support on-the-fly operation, the DRR2 algorithm implements the following equation:

$$S_{i_1} = \sum_{j=0, j \neq i_o}^{m-1} (T^{i_o} + T^{i_1})^{-1} \cdot (T^{i_o} + T^j) \cdot S_j \text{ where} \quad (5)$$

$s_{i_1}$=symbol being (re) constructed in DRR2

$i_o$=position of symbol being (re) constructed in DRR1

It will be appreciated that the DRR2 algorithm does not use the symbol constructed from the DRR1 algorithm in its result. The reason for executing DRR2 first then DRR1 second will be made apparent below.

Figure 6A:
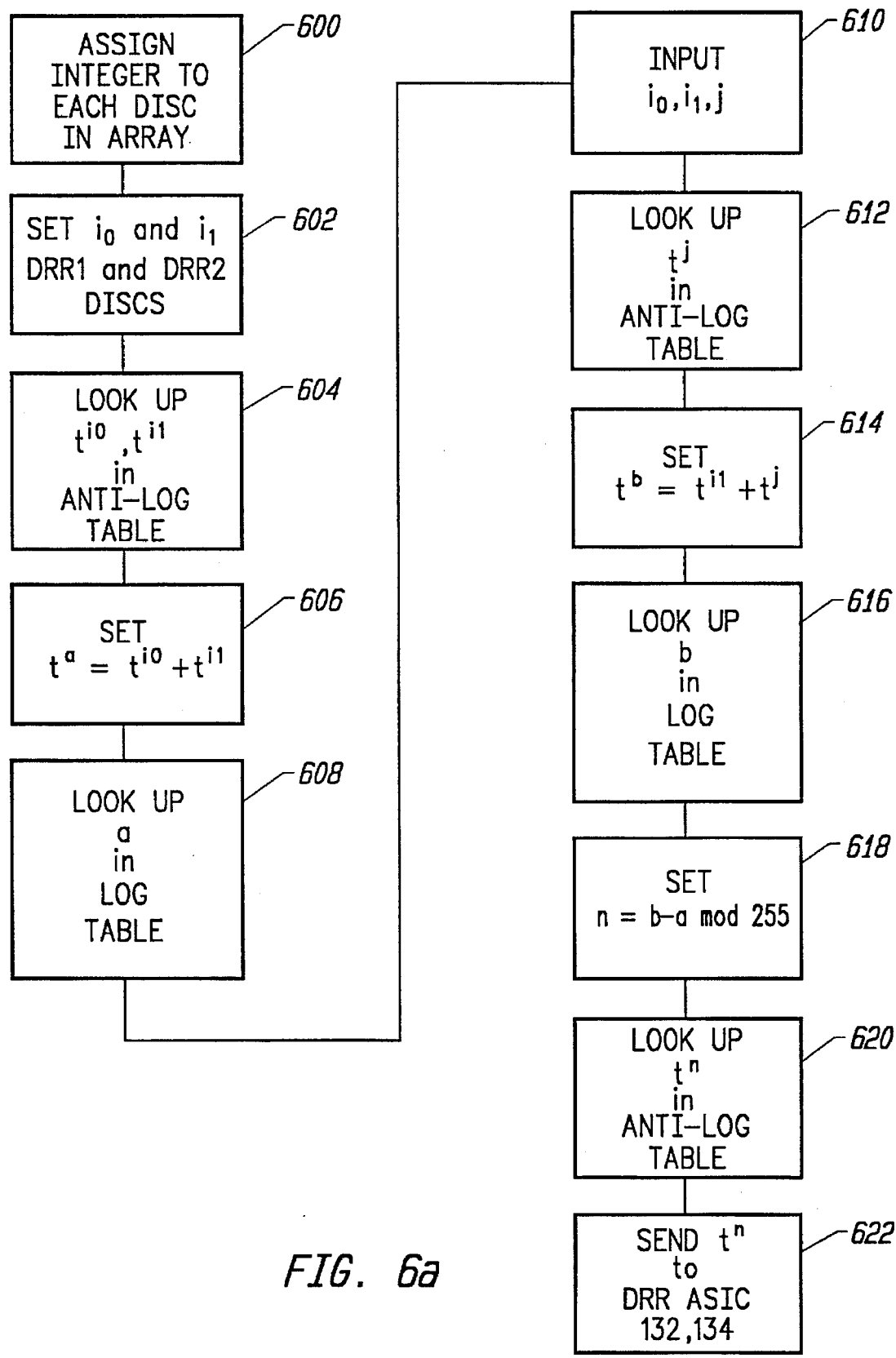
FIG. 6a is a flow chart of the method of forming the DRR coefficients $t_n$ in accordance with the principles of the present invention.

Referring now to FIG. 6a, a flow chart is shown for forming the DRR coefficients required during the construction mode. A unique integer 0–255 is assigned to each disc in the array. The user must first designate which discs in the array are to be used for redundancy data DRR1 and DRR2, resulting in the designation of a first integer $i_o$ and a second integer $i_1$ corresponding to the DRR1 and DRR2 disc locations. Integer $i_o$ and $i_1$ are used to calculate a common term for use in determining the individual DRR coefficients to be used for each data disc in the array. The common term is calculated by the use of log and antilog tables.

The construction and reconstruction equations employ a number of matrix addition and multiply operations. These operations are very expensive in terms of processing time and space requirements. Fortunately, there are simplifications that can alleviate this overhead. The observation that the T-matrices referred to above can be placed into a one-to-one correspondence with a set of fixed column vectors for the T-matrices leads to improvements in computing the above equations. In the preferred embodiment, the first column vector of each T-matrix is used. This first column vector is termed the DRR coefficient.

There is a one-to-one correspondence between the set of T-matrices and the integer exponents of the T-matrices because the non-zero T-matrices form a cyclic group under mod 2 matrix multiplication. For example, the integer i can be uniquely mapped onto the T-matrix $T^i$. In his article, Patel discusses the use of two tables, an antilog and a log table, that codifies the mapping of integer exponents of the T-matrices onto the set of DRR coefficients and the reverse mapping respectively.

To see how the log and antilog tables work, let $t^j$ be the DRR coefficient for $T^j$ and let A(j) denote the antilog table entry for the T-matrix $T^j$. That is, A(j)=$t^j$. Likewise, let L($t^j$) denote the log table entry for the DRR coefficient $t^j$. That is, L($t^j$)=j.

It can be seen that the table look-up method saves on processing overhead. Without the log and antilog tables, the same calculation in equation 12 for a fixed k would require two 8×8 matrix additions, one 8×8 matrix inversion, and one 8×8 matrix multiplication to yield a new matrix, say $T^n$. Instead, the table look-up method above requires only four antilog table look-ups, three 8-bit exclusive-or operations, and two log table look-ups to yield the DRR coefficient $t^n$. Given that matrix operations are very space and time intensive, there is savings of both time and space in implementing the table look-up method.

Referring back to FIG. 6a, the common term for the DRR coefficients is generated by first looking up in the antilog table the integers $i_o$ and $i_l$ (in hexadecimal form). The results are then bitwise exclusive-or'ed to yield a resultant matrix coefficient $t_a$. Finally the log table is utilized to solve for the integer a which is stored for use in the determination of individual DRR coefficient multipliers.

The first data disc in the array for storing a block of data is identified and assigned a unique integer $j_l$ from 0–255. The antilog tables are then used for looking up the integers $i_o$ (corresponding to the DRR1 disc) and $j_l$ (in hexadecimal form). The results are then bitwise exclusive or'ed to yield a resultant matrix coefficient $t^b$. The log table is utilized to solve for the integer b. A resultant value n is then calculated by subtracting a (the common term from above) from b. A final look-up in the antilog table will convert the value of n to $t^n$, the DRR coefficient, which is unique for this disc. This process is repeated for each disc in the disc array.

Instead of adding and multiplying many T-matrices to solve the equation, the log and antilog tables simplify the solution for a single calculation for each fixed k:

$$t^{j_o} = A(j_o) \quad t^{j_o} = A(j_o) \qquad (6)$$
$$t^{j_1} = A(j_1) \quad t^{j_1} = A(j_1)$$
$$t^a = t^{j_o} + t^{j_1} \quad t^a = t^{j_o} + t^k$$
$$a = L(t^a) \quad b = L(t^b)$$

$$n = b - a \bmod 255$$

$$t^n = A(n)$$

Figure 6B:
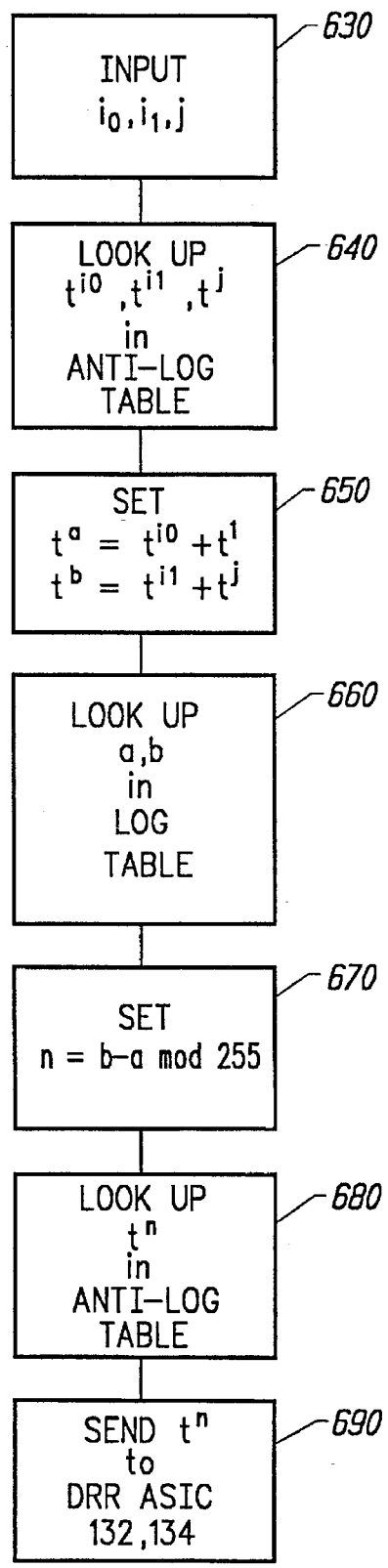
FIG. 6b is a flow chart of the software resident in DRAM that calculates the DRR coefficients $t_n$.

In the preferred embodiment of the present invention software resident in DRAM 141 calculates the DRR coefficient $t^n$ as outlined in equations 5 and 6. Referring now to FIG. 6b, a flow chart of the software resident in the DRAM 141 is presented. First, the summation in equation 5 is initialized by inputting the positional variables $i_o$ and $i_l$ and j. Then A($i_o$), A($i_l$), and A(j) are looked-up in the antilog tables of FIGS. 7A–7E resident in DRAM 141. The calculation in 740 yields $t^a$ and $t^b$. The exponents, a and b, are found by a look-up in log tables of FIGS. 8A–8E at step 660. The exponent of the DRR coefficient $t^n$ is found by subtracting a from b and placing the result is proper modulo 255 form, that is adding 255 if the result is negative. From the exponent n, $t^n$ is found by a look-up in the antilog tables of FIGS. 7A–7E. Finally, $t^n$ is sent to DRR2 ASIC 134 for expansion into the $T^n$ matrix.

Referring again to FIG. 4, the DRR coefficient $t^n$ is transferred as an input into the DRR2 module 134 at CR1 201. To finish the above calculation in equation 5, the T-matrix $T^n$ associated with the DRR coefficient $t^n$ must be created or looked up and multiplied by the symbol $s_j$ (the data to be stored at the disc j). One possible solution would be to maintain a separate table that cross-references the individual T-matrices to their DRR coefficients. That solution, however, would require storing 255 8×8 bit matrices in a look-up table. Once the look-up is complete, then the selected 8×8 matrix would then have to be transmitted from storage to the processing unit.

The presently claimed invention improves on this solution by using a unique relationship that exists between the individual T-matrices and their DRR coefficients. This relationship is implemented in both the hardware and software of the present system. This implementation represents part of the inventive steps of the presently claimed invention.

The present invention avoids having to store all 255 8×8 matrices because, given the first column of the matrix, the entire matrix can be formed from that column using the equation:

$$\text{coln}(n + 1) = \text{coln}(n) \cdot 2h, \text{ if } \text{coln}(n) \leq 7F_h \qquad (7)$$
$$[\text{coln}(n) \cdot 2_h] \oplus A9_h, \text{ if } \text{coln}(n) \geq 80_h$$

This relationship treats each column vector as a binary integer where the first four bits reading from the top of the matrix is treated as the lower order bits of the integer and the last four bits are the higher order bits. Thus, if the column vector, as read as a binary integer, is greater than $80_h$, the column vector is multiplied by 2 and the number $A9_h$ is added to the result. Otherwise, the column vector is merely multiplied by 2. The constant $A9_h$ is termed the T-polynomial constant in the present invention and is stored in the T-polynomial constant register 406. It will be appreciated by those ordinarily skilled in the art that other values may be used for the T-Polynomial constant as is known in the art. The use of the value $A9_h$ should not be construed as limiting. It will also be noted that the multiplication of 2 to the column vector is equivalent to a shift of one bit to the left.

Figure 9:
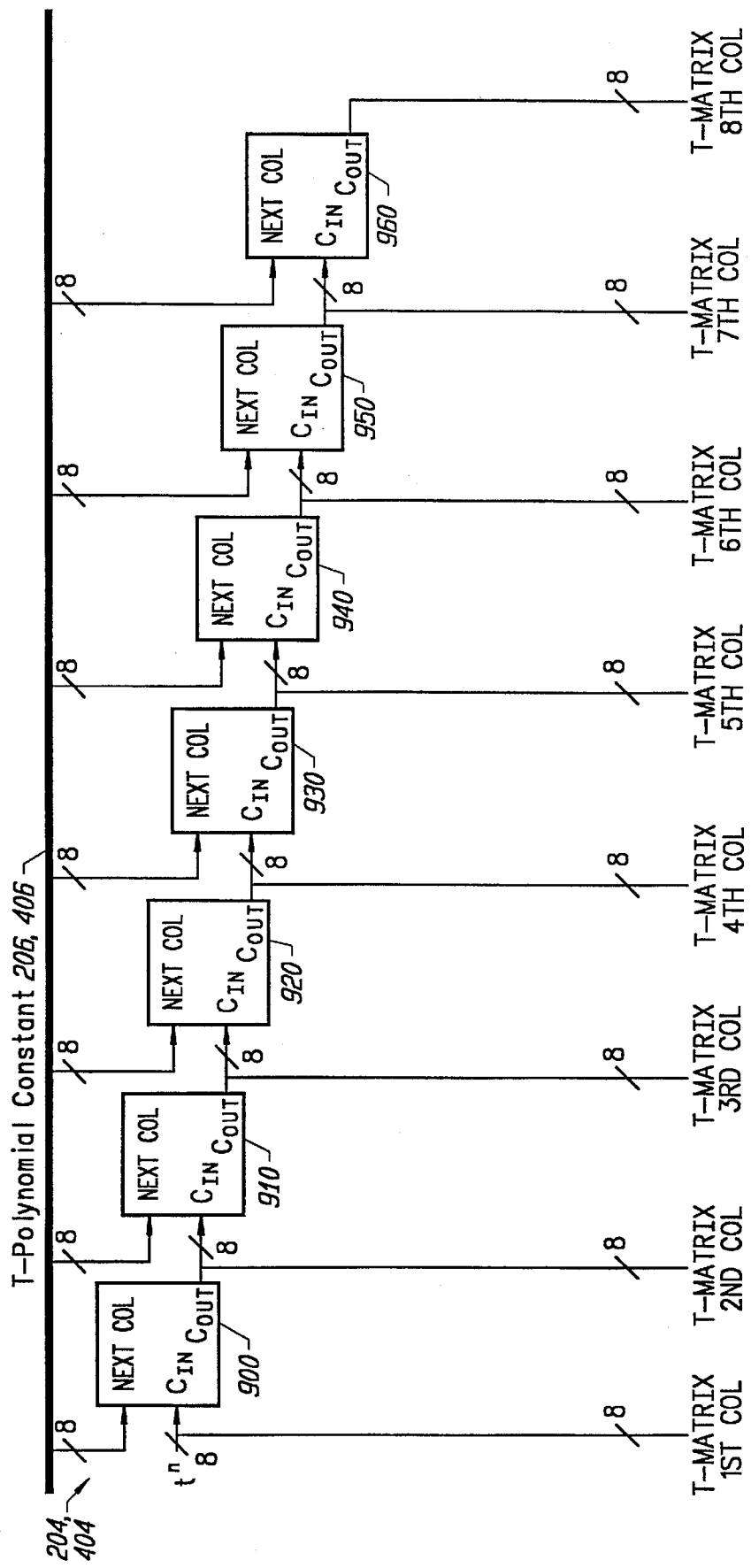
FIG. 9 shows a block diagram of the T-matrix circuitry that generates an individual T matrix, one column at a time.

It will now be explained how T-Matrix module 404 forms the matrix $T^n$ from DRR coefficient $t^n$. FIG. 9 shows the internal architecture of T-Matrix 404. T-Matrix 404 is implemented by NextCol modules 900, 910, 920, 930, 940, 950, 960 arranged in series. The first NextCol module 900 receives as input both the T-polynomial constant, $A9_h$, and DRR coefficient $t^n$. DRR coefficient $t^n$ is, in the preferred embodiment, the first column of matrix $T^n$. Thus, $t^n$ is immediately sent as the output of the first column. NextCol 900 computes the second column according to equation 7. NextCol 910, 920, 930, 940, 950, 960, each in turn, accept the previous column vector and the T-polynomial constant as input and generates the next column vector according to equation 7. At the end of the pipeline, the full matrix $T^n$ has been generated.

FIG. 10 shows the internal hardware that implements equation 7 in NextCol modules 1000, 1010, 1020, 1030, 1040, 1050, and 1060. According to equation 7, if the previous column was less than $80_h$, then the next column is just a shift-left. Mutiplexors 1070, 1080, 1090, 1100, 1110, 1120, and 1130 as well as AND 1140 implement this by reading line Cin(7). If Cin(7) is zero, then the condition that the previous column is less than $80_h$ is satisfied and all the multiplexors select line $y_0$ as their outputs. It will be noted that the output of each multiplexor is considered as a left displacement by one bit by virtue of the labelling of its output lines. This labelling convention effects the necessary shift-left.

If, however, the previous column is greater than or equal to $80_h$, then Cin(7) is one and each multiplexor selects $y_1$ as their outputs. The signal on each line $y_1$ is the exclusive-or of that particular Cin and Poly bit. Because T-polynomial constant is the constant $A9_h$, the Poly lines are constant. More precisely, Poly(7)=1, Poly(6)=0, Poly(5)=1, Poly(4)= 0, Poly(3)=1, Poly(2)=0, Poly(1)=0, and Poly(0)=1. Thus, it is seen that the output of the multiplexors is the correct result of equation 7 in both cases.

In the preferred embodiment, the first column is used as both the DRR coefficient that is stored in the log and antilog tables as well as the fixed column that generates the associated T-matrix according to the above equation.

Referring again to FIG. 4, in order to complete the DRR2 coefficient generation, the DRR2 ASIC 134 receives data from the Host 120 via the host interface controller 120 on the A-bus 170. The A-bus controller initiates the construction mode designating the DRR2 ASIC 134 as a destination and generates the control words for configuring the DRR2 ASIC 134 based on inputs received from the microprocessor 140. The control words designate what starting address in the accumulator is to be accessed and also the DRR coefficient $t^n$ associated with the destination disc in the array. Those ordinarily skilled in the art will recognize that when DRR2 redundancy is selected by a user, the A-bus controller 170 routes all of the data symbols $s_k$ to both the DRR1 module 132 for use in the creation of the DRR1 coefficient (as described above), and to the DRR2 module 134 for use in the creation of the DRR2 coefficient, as well as directly to the designated disc in the disc array for storage.

A first block signal A1BLK is generated by the A-bus controller 160 and is passed to the DRR2 ASIC 134. The A-bus controller 160 thereafter initializes the first block of data $s_k$ from the HIC 120 to be loaded onto a first location in the disc array 460 via PIC 400 and into the DRR2 ASIC 134. T-Matrix 404 calculates the T-matrix, $T^n$, from DRR coefficient $t^n$ according to equation 7 and outputs the result into Multiply module 408. The matrix $T^n$ is multiplied by $s_k$ (the first data term) which is transferred from A-Bus 170. The result of this matrix multiply is sent to Exclusive-or module 412 where it is exclusive-or'ed with the partial result held in register 424, if any exists. The result of Exclusive-or module 412 is held in register 416 and stored into dual port accumulator 418 so that either the partial result can be recycled to multiplexor 414 or the final solution can be outputted to A-Bus 170.

This process is repeated for each data block $s_k$ to be stored until the final solution, the DRR2 coefficient is written to the $i_t$ disc in the array and to the DRR1 module 132 as the last data symbol for use in the creation of the DRR1 coefficient. The DRR1 coefficient calculation may then be performed as highlighted above thereby completing the construction mode. During construction, the preferred embodiment sets aside the 2 symbols, $s_{i_o}$ and $s_{i_t}$, as the DRR1 and DRR2 redundancy symbols respectively for the array group. These redundancy symbols have their values based upon the other commercial symbols in the group as defined in equations 2, 3, 5 and 6 above.

The refresh mode is initiated whenever any individual symbol $s_k$ stored in the disc array is to be updated. A read-modify-write process is performed whereby the old redundancy data symbol $s_{i_t}(old)$ (DRR2) are read along with the old data symbol $s_{j(old)}$ and new data symbol $s_{j(new)}$ in order to calculate the new DRR2 symbol. To support read-modify-write operation, the DRR2 algorithm implements the equation:

$$S_{i_t}(\text{new}) = (T^{i_o} + T^{i_1})^{-1} \cdot (T^{i_o} + T^j) \cdot S_j(\text{old}) + \quad (8)$$
$$(T^{i_o} + T^{i_1})^{-1} \cdot (T^{i_o} + T^j) \cdot S_{i_t}(\text{old}) +$$
$$(T^{i_o} + T^{i_1})^{-1} \cdot (T^{i_o} + T^j) \cdot S_j(\text{new})$$

s=8-bit commercial or redundancy data
$i_o$=position of DRR1 redundancy symbol
$i_t$=position of DRR2 redundancy symbol
j=position of data symbol being modified Accordingly, the preferred embodiment of the present invention generates the DRR coefficient $t^n$ for the disc j whose data is to be updated as described previously. The DRR coefficient $t^n$ is transferred into DRR2 ASIC 134. T-Matrix 404 calculates the T-matrix, $T^n$, from DRR coefficient $t^n$ according to equation 7 and outputs the result into Multiply module 408. The matrix $T^n$ is multiplied by $s_{j(old)}$ (the data to be updated) which transferred from A-Bus 170. The result of this matrix multiply is sent to Exclusive-or module 412 where it is exclusive-or'ed with the identity byte ("0" byte) from the multiplexor 414. The result of Exclusive-or module 412 is held in register 416 and stored into dual port accumulator 418.

Thereafter, the second DRR coefficient $t^n$ for the disc $i_t$ which holds the DRR2 symbol $si_t$ is generated. The DRR coefficient $t^n$ is transferred to DRR2 ASIC 134. T-Matrix 404 calculates the T-matrix, $T^n$, from DRR coefficient $t^n$ according to equation 7 and outputs the result into Multiply module 408. The matrix $T^n$ is multiplied by $s_{i_t(old)}$ (the old DRR2 symbol) which is transferred from A-Bus 170. The result of this matrix multiply is sent to Exclusive-or module 412 where it is exclusive-or'ed with the partial result held in register 424 calculated from above. The result of Exclusive-or module 412 is held in register 416 and stored into dual port accumulator 418.

Finally, the third DRR coefficient $t^n$ for the disc j is re-calculated for the destination disc. The DRR coefficient $t^n$ is transferred into DRR2 ASIC 134. T-Matrix 404 calculates the T-matrix, $T^n$, from DRR coefficient $t^n$ according to equation 14 and outputs the result into Multiply module 408. The matrix $T^n$ is multiplied by $s_{j(new)}$ (the new data symbol) which is transferred from A-Bus 170. The result of this matrix multiply is sent to Exclusive-or module 412 where it is exclusive-or'ed with the partial result held in register 424 calculated from above. The result of Exclusive-or module 412 is held in register 416, stored into dual port accumulator 418 and thereafter written as the final solution, the new DRR2 symbol $s_{i_t}$, to A-Bus 170.

Correspondingly, those ordinarily skilled will recognize that the new DRR1 symbol $s_{i_o(new)}$ may be calculated from the new data symbol $s_{j(new)}$, the old data symbol $s_{j(old)}$ and the old DRR1 symbol $s_{i_o(old)}$ as described above in a manner completely independent from the DRR2 symbol update.

The third mode of operation, the reconstruction mode, is implemented upon the failure of a pair of disc drives in the array, that is, two disk drives, $j_o$ and $j_t$, fail concurrently. To reconstruct their data, the equation for DRR2 reconstruction (EQUATION 5) must first be executed to reconstruct the data for one of the disks, say $j_t$, followed by the execution of the DRR1 equation (EQUATION 2) to reconstruct the data for the second disc $j_o$. During construction, the preferred embodiment sets aside the 2 symbols, $s_{i_o}$ and $s_{i_t}$, as the DRR1 and DRR2 redundancy symbols respectively for the array group. These redundancy symbols have their values based upon the other commercial symbols in the group as defined in equations 2, 3, 5 and 6 above. It can be shown that these values solve the above system of linear equations in equation 9.

$$\begin{bmatrix} 1 & 1 & 1 & \cdots & 1 \\ 1 & T^1 & T^2 & \cdots & T^{m-1} \end{bmatrix} \begin{bmatrix} s_0 \\ s_1 \\ \cdot \\ \cdot \\ \cdot \\ s_{m-1} \end{bmatrix} = 0 \quad (9)$$

where $s_j$ is the $j^{th}$ symbol in the array group.

To see how data is reconstructed from a double disk failure, suppose any two of the array disks, say $j_o$ and $j_1$, fail concurrently. The data on these disks is reconstructible by solving the following system of equations:

It can be shown that, from the values given the DRR1 and DRR2 symbols above, the a-symbols are as follows:

$$\begin{bmatrix} I & I \\ T^{j_o} & T^{j_1} \end{bmatrix} \begin{bmatrix} S_{j_o} \\ S_{j_1} \end{bmatrix} = \begin{bmatrix} a_{j_o} \\ a_{j_1} \end{bmatrix} \quad (10)$$

$$a_{j_o} = \sum_{k=0, k\neq j_o, j_1}^{m-1} S_k \quad (11)$$

$$a_{j_1} = \sum_{k=0, k\neq j_o, j_1}^{m-1} T^k \cdot S_k$$

A solution to the set of linear equations in equation 10 is guaranteed because the determinant of the 2×2 matrix is nonzero. Mathematically expressed, $$\begin{bmatrix} I & I \\ T^{j_o} & T^{j_1} \end{bmatrix} = T^{j_1} \cdot I - T^{j_o} \cdot I = T^{j_1} - T^{j_o} \quad (12)$$

Because all the T-matrices are distinct, the above determinant is nonzero which implies that a solution to the above set of linear equations exists. The solution to the data symbols, $s_{j_o}$ and $s_{j_1}$, is thus:

$$s_{j_o} = \sum_{k=0, k\neq j_o}^{m-1} s_k \quad (13)$$

$$S_{j_1} = \sum_{k=0, K\neq j_o}^{m-1} (T^{j_o} + T^{j_1})^{-1} \cdot (T^{j_o} + T^k) \cdot S_k$$

Several aspects of the solution to $s_{j_o}$ and $s_{j_1}$ should be appreciated. First, the solution for reconstructing two arbitrary symbols is the same as the equations for the initially constructing the DRR1 and DRR2 symbols. As such the reconstruction mode of the present invention is implemented by operating on each data symbol $s_j$ and the DRR2 symbol $s_{i_1}$ according to equation 5 above and solving for $s_{j_1}$ data symbol to be reconstructed. Second, the order of construction and reconstruction of data symbols is important. The DRR2 symbol must be constructed before the DRR1 symbol because the DRR1 equation uses the DRR2 symbol as an input.

Specifically, the reconstruction mode is implemented as follows. The first valid data symbol $s_j$ is read by the A-bus controller 160 from a first disc j (where $j\neq j_o$ or $j_1$) in the disc array into the DRR2 module 134.

The DRR coefficient $t^n$ for the disc j is generated as described previously. The DRR coefficient, $t^n$ is transferred into DRR2 ASIC 134. T-Matrix 404 calculates the T-matrix, matrix, $T^n$, from DRR coefficient $t^n$ according to equation 14 and outputs the result into Multiply module 408. The matrix $T^n$ is multiplied by $s_j$ (the first data symbol (old) that was not corrupted) which is transferred from A-Bus 170. The result of this matrix multiply is sent to Exclusive-or module 412 where it is exclusive-or'ed with the identity byte ("0" byte) from the multiplexor 414. The result of Exclusive-or module 412 is held in register 416 and stored into dual port accumulator 418.

Thereafter, a second DRR coefficient $t^n$ for the next disc j is generated. The DRR coefficient $t^n$ is transferred into DRR2 ASIC 134. T-Matrix 404 calculates the T-matrix, $T^n$, from DRR coefficient $t^n$ according to equation 7 and outputs the result into Multiply module 408. The matrix $T^n$ is multiplied by $s_j$ (the second data symbol (old) that was not corrupted) which is transferred from A-Bus 170. The result of this matrix multiply is sent to Exclusive-or module 412 where it is exclusive-or'ed with the partial result held in register 424 calculated from above. The result of Exclusive-or module 412 is held in register 416 and stored into dual port accumulator 418.

This process continues for all of the valid data discs j ($j\neq j_o$ or $j_1$). Finally, the DRR coefficient $t^n$ for the disc $j_{i_1}$ the DRR2 disc, is calculated. The DRR coefficient $t^n$ is transferred to DRR2 ASIC 134. T-Matrix 404 calculates the T-matrix, $T^n$, from DRR coefficient $t^n$ according to equation 7 and outputs the result into Multiply module 408. The matrix $T^n$ is multiplied by $s_{i_1}$(old) (the old DRR2 symbol) which transferred from A-Bus 170. The result of this matrix multiply is sent to Exclusive-or module 412 where it is exclusive-or'ed with the partial result held in register 424 calculated from above. The result of Exclusive-or module 412 is held in register 416, stored into dual port accumulator 418 and thereafter written as the final solution, the reconstructed $j_1$ symbol $s_{j_1}$, to A-Bus 170 for storage at disc $j_1$. Finally, the reconstruction process for the second symbol $s_{j_o}$ is performed by implementing the DRR1 reconstruction process as highlighted above. The final result $s_{j_o}$ from the DRR1 reconstruction is read back onto the A-bus 170 via the accumulator 418 and accumulator read register 424 to be written to the corresponding memory location on disc $j_o$ of the disc array via PIC $j_o$.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. In a data storage system having a plurality of data storage devices, an apparatus for constructing and reconstructing redundancy data by utilizing a set of N×N T-matrices formed from a polynomial of degree N, said apparatus comprising:

said plurality of data storage devices arranged in a parallel array;

a host interface means for receiving read and write requests from a host for data stored in said plurality of data storage devices;

a means for constructing a reconstructing said redundancy data, said means comprising a means for constructing each of said N×N T-matrices, each of a select one of said N×N T-matrices constructed from a given column vector of said selected N×N T-matrix according to the following equation:

$$coln(n+1) = [coln(n) \cdot 2_b, \text{ if } coln(n) \leq 7F_h]$$
$$[[coln(n) \cdot 2_h] \oplus A9_h, \text{ if } coln(n) \geq 80_h]$$

2. The apparatus as recited in claim 1 wherein said polynomial is primitive.

3. The apparatus as recited in claim 2 wherein said given column is the first column of said T-matrices.

4. The apparatus as recited in claim 3 wherein the entries of said T-matrices are binary digits.

5. In a processing board, a circuit for generating a next column vector of a T-matrix for use in providing redundancy data for a data storage device, said circuit comprising:
   a first circuit element for receiving a preceding column vector;
   a second circuit element for receiving a T-polynomial constant;
   a third circuit element for performing an exclusive-or of said preceding column vector and said T-polynomial constant;
   a fourth circuit element for shifting said preceding column vector; and
   a fifth circuit element for selecting said next column vector from either said third or fourth circuit element.

6. The circuit of claim 5,
   said T-polynomial constant is set to $A9_h$.

7. The circuit of claim 5,
   said fourth circuit element performing a left-shift operation.

8. A computer-implemented method for constructing data in an array of disks, said method comprising the steps of:
   (a) partitioning said array into at least one group of m disks;
   (b) selecting at least two of said disks as redundancy disks and m-2 of said disks as data disks, said redundancy disks storing a plurality of second-level redundancy codewords, each said redundancy codeword including a first codeword and a second codeword;
   (c) assigning a first one of said redundancy disks to store said first codewords and a second one of said redundancy disks to store said second codewords, each of said first codewords representing data stored at a specified location in each of said data disks and said second redundancy disk, each said first set codewords used to restore said represented data when specified ones of said disks fail, each of said second codewords representing data stored at a specified location in each of said data disks, each of said second codewords used to restore said represented data when two of said data disks fails;
   (d) identifying as a first symbol, one of said first codewords and as a second symbol, one of said second codewords;
   (e) forming a subset of said disks, said subset including each said data disk;
   (f) generating said second symbol, said generation comprising the steps of:
      (i) for each disk of said subset,
         (1) formulating an n-bit column vector $t^n$ representing a first column of a N×N T-matrix associated with a specified one of said disks of said subset, said T-matrix corresponding to a predefined polynomial of degree N,
         (2) expanding said column vector into an associated T-matrix,
         (3) determining a partial sum associated with said specified disk, said partial sum determined as a modula-2 product of said associated T-matrix and a data symbol read from said specified disk;
      (ii) computing said second symbol as a modula-2 sum of each said partial sums; and
      (iii) storing said second symbol in said second redundancy disk;
   (g) generating a first symbol; and
   (h) storing said first symbol in said first redundancy disc drive.

9. The method of claim 8,
   said step (g) generating said first symbol in accordance with the following equation:

$$S_{i_0} = \sum_{j=0, j \neq i_0}^{m-1} S_j$$

where m is the number of disc drives in the array,
   $i_o$ is the redundancy disc associated with the first symbol,
   $s_j$ is the data symbol corresponding to the j-th data disk, and
   the summation is a modula-2 sum.

10. The method of claim 8,
   said step (f)(i)(1) formulating said column vector $t^n$ in accordance with the following equation:

$$t^n = A(b-a \bmod 255)$$

where $$b = L(t^{i_k} \oplus t^i),$$
$$t^{i_l} = A(i_l),$$
$$t^i = A(j),$$
$$a = L(t^*),$$
$$t^* = t^{i_0} \oplus t^{i_l},$$
$$t^{i_0} = A(i_0),$$
$$t^{i_l} = A(i_l),$$

A represents the antilog operation,
L represents the log operation,
$i_l$ represents the second redundancy disk,
$i_o$ represents the first redundancy disk, and
j represents a specified disk.

11. The method of claim 10,
   wherein said antilog operation A is performed as a table look-up operation in an antilog table.

12. The method of claim 10,
   wherein said log operation L is performed as a table look-up operation in a log table.

13. The method of claim 8,
   said step (f)(i)(2) is expanded in accordance with the following equation:

$$\text{column}(n+1) = \text{column}(n) \cdot 2_h, \text{ if column}(n) \leq 7H_h \text{ OR}$$
$$\text{column}(n) \cdot 2_h \oplus A9_h, \text{ if column}(n) \geq 80_h$$
where $n > 1$.

14. The method of claim 8 further comprising the step of:
when at least two of said data disks fail simultaneously,
identifying as said first symbol, datum to be restored in one of said failed disks and as said second symbol, datum to be restored to a second one of said failed disks,
reforming said subset of said disks to include each said non-failed disk in said group,
repeating steps (f)(i) through (f)(ii) to reconstruct said second symbol,
storing said reconstructed second symbol in a corresponding disk,
repeating step (g) to reconstruct said first symbol, and storing said reconstructed first symbol in a respective disk.

15. The method of claim 8,
when a read-modify-write operation is performed on a datum stored in one of said data disks,
repeating said steps (f)(i)(1)-(f)(i)(2) to formulate a corresponding T-matrix, $T^n$, for a data disk associated with said updated datum;
updating an associated second codeword in accordance with the following mathematical relation:

$$S_{i_1}(\text{new}) = T^n \cdot S_j(\text{old}) +$$
$$T^n \cdot S_{i_j}(\text{old}) +$$
$$T^n \cdot S_j(\text{new}), \text{ where}$$

$S_{i_j}$ is the second codeword,
$S_j(\text{old})$ is the old value of the datum stored on disk $j$,
$S_j(\text{new})$ is the updated value of the datum.

16. The method of claim 15, further comprising the step of updating an associated first set codeword when a read-modify-write operation is performed on a datum stored in one of said data disks.

17. A method for constructing redundancy data in a I/O system having an array of data storage devices, said method comprising the steps of:
(a) selecting at least one of said data storage devices for storage of said redundancy data, said redundancy data used to restore data residing in more than one of said data storage devices;
(b) providing at least one column vector representing a first column of a N×N T-matrix associated with a polynomial of degree N, each said column vector associated with a specified one of said data storage devices;
(c) expanding each said column vector into an associated T-matrix in accordance with the following mathematical relation:

$$\text{column}(n+1) = \text{column}(n) \cdot 2_h, \text{ if column}(n) \leq 7H_h \text{ OR}$$
$$\text{column}(n) \cdot 2_h \oplus A9_h, \text{ if column}(n) \geq 80_h$$
where $n > 1$.

(d) utilizing said generated T-matrices to construct said redundancy data; and
(e) storing said redundancy data in said redundancy data storage device.

18. An apparatus for generating redundancy data for use in an I/O system including an army of storage mediums, comprising:

at least one group of m storage mediums, each said group including at least one redundancy storage medium and at least one data storage medium, each said redundancy storage medium for storing said redundancy data, each said data storage medium for storing information data;
a first processing unit including a first memory for storing a program including instructions to generate an n-bit column vector $t^n$ representing a first column of a N×N T-matrix associated with a specified one of said data storage mediums;
a second processing unit, coupled to said first processing unit and to said storage mediums, for generating said redundancy data and transmitting said redundancy data to a respective redundancy storage medium, said second processing unit including:
a matrix generating circuit for receiving said column vector and generating a corresponding N×N matrix, $T^N$, representing a predefined polynomial expression;
a multiplier, coupled to said matrix generating circuit, for performing a modula-2 product of said matrix with a datum associated with one of said data storage mediums, said multiplier generating a first result; and
a modula-2 summation circuit, coupled to said multiplier and a second memory, for summing said first result with a specified partial sum stored in said second memory, said summation circuit generating a second result that is stored in said second memory;
said program further including instructions that
for each said data storage medium, transmit a column vector $t^n$ associated with a specified data storage medium to said second processing unit, transmit a datum associated with said specified data storage medium to said second processing unit, transmit a plurality of control signals to said second processing unit, a first subset of said control signals for use in generating a partial sum associated with said data storage medium, a second subset of said control signals for transmitting said generated redundancy data to said specified data storage medium.

19. The apparatus of claim 18,
said second processing unit further comprising a storage device coupled to said matrix generating circuit, said storage device used to store a T-polynomial constant value, $A9_h$, for use by said matrix generating circuit for generating said matrix; and
said matrix generating circuit, further coupled to said storage device, and generating said matrix in accordance with the following mathematical relation:

$$\text{column}(n+1) = \text{column}(n) \cdot 2_h, \text{ if column}(n) \leq 7H_h \text{ OR}$$
$$\text{column}(n) \cdot 2_h \oplus A9_h, \text{ if column}(n) \geq 80_h$$
where $n > 1$.

20. The apparatus of claim 18,
said redundancy data including a first codeword and a second codeword;
said second processing unit generating a first codeword for storage in a first redundancy storage medium; and
a third processing unit, identical to said second processing unit, coupled to said first processing unit and said storage mediums, for generating said second codeword for storage in a second redundancy storage medium.

* * * * *